US009971706B2

(12) United States Patent
McHugh et al.

(10) Patent No.: US 9,971,706 B2
(45) Date of Patent: *May 15, 2018

(54) SYSTEM AND METHOD FOR LOGICAL DELETION OF STORED DATA OBJECTS

(71) Applicant: Amazon Technologies, Inc., Seattle, WA (US)

(72) Inventors: Jason G. McHugh, Seattle, WA (US); Praveen Kumar Gattu, Redmond, WA (US); Michael A. Ten-Pow, Seattle, WA (US); Derek Ernest Denny-Brown, II, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/425,853

(22) Filed: Feb. 6, 2017

(65) Prior Publication Data
US 2017/0147512 A1 May 25, 2017

Related U.S. Application Data

(60) Continuation of application No. 14/992,915, filed on Jan. 11, 2016, now Pat. No. 9,563,578, which is a
(Continued)

(51) Int. Cl.
G06F 12/00 (2006.01)
G06F 12/14 (2006.01)
(Continued)

(52) U.S. Cl.
CPC ........ G06F 12/1466 (2013.01); G06F 3/0622 (2013.01); G06F 3/0652 (2013.01);
(Continued)

(58) Field of Classification Search
CPC ............. G06F 11/1435; G06F 11/1453; G06F 17/30117; G06F 17/3023; G06F 17/30356;
(Continued)

(56) References Cited

U.S. PATENT DOCUMENTS 6,611,840 B1 8/2003 Baer et al.
6,684,227 B2 1/2004 Duxbury
(Continued)

Primary Examiner — Zhuo Li
(74) Attorney, Agent, or Firm — Robert C. Kowert; Meyertons, Hood, Kivlin, Kowert & Goetzel, P.C.

(57) ABSTRACT

Systems and methods for providing object versioning in a storage system may support the logical deletion of stored objects. In response to a delete operation specifying both a user key and a version identifier, the storage system may permanently delete the specified version of an object having the specified key. In response to a delete operation specifying a user key, but not a version identifier, the storage system may create a delete marker object that does not contain object data, and may generate a new version identifier for the delete marker. The delete marker may be stored as the latest object version of the user key, and may be addressable in the storage system using a composite key comprising the user key and the new version identifier. Subsequent attempts to retrieve the user key without specifying a version identifier may return an error, although the object was not actually deleted.

21 Claims, 16 Drawing Sheets

Related U.S. Application Data continuation of application No. 14/673,808, filed on Mar. 30, 2015, now Pat. No. 9,235,476, which is a division of application No. 13/953,447, filed on Jul. 29, 2013, now Pat. No. 8,996,831, which is a division of application No. 12/886,757, filed on Sep. 21, 2010, now Pat. No. 8,504,758.

(51) Int. Cl.
  *G06F 3/06* (2006.01)
  *G06F 17/30* (2006.01)
(52) U.S. Cl.
  CPC ...... *G06F 3/0673* (2013.01); *G06F 17/30356* (2013.01); *G06F 2212/1052* (2013.01)
(58) Field of Classification Search
  CPC ............. G06F 2201/80; G06F 2201/84; G06F 3/0608; G06F 3/0619; G06F 3/0652; G06F 3/067; G06F 3/0671; G06F 12/1466; G06F 2212/1052
  See application file for complete search history.

(56) References Cited

U.S. PATENT DOCUMENTS

| | | | |
|---|---|---|---|
| 6,874,001 | B2 | 3/2005 | Narang et al. |
| 7,099,896 | B2 * | 8/2006 | Fields ................... G06Q 10/10 |
| 7,496,555 | B2 | 2/2009 | Margolus |
| 8,131,723 | B2 | 3/2012 | Sim-Tang |
| 8,196,191 | B2 | 6/2012 | Norman et al. |
| 8,285,925 | B1 | 10/2012 | Sorenson, III et al. |
| 8,302,169 | B1 | 10/2012 | Presotto et al. |
| 8,504,758 | B1 | 8/2013 | McHugh et al. |
| 8,533,170 | B1 * | 9/2013 | McHugh ............. G06F 17/3023 707/695 |
| 8,650,156 | B1 * | 2/2014 | McHugh ........... G06F 17/30194 707/638 |
| 8,849,825 | B1 | 9/2014 | McHugh et al. |
| 8,996,831 | B1 * | 3/2015 | McHugh ........... G06F 17/30117 707/638 |
| 9,235,476 | B2 | 1/2016 | McHugh et al. |
| 9,563,578 | B2 * | 2/2017 | McHugh ........... G06F 17/30117 |
| 2002/0073110 | A1 | 6/2002 | Duvillier et al. |
| 2002/0103814 | A1 | 8/2002 | Duvillier et al. |
| 2003/0061245 | A1 | 3/2003 | Soria, Jr. et al. |
| 2003/0147536 | A1 | 8/2003 | Andivahis et al. |
| 2005/0262165 | A1 | 11/2005 | Scott et al. |
| 2007/0192544 | A1 | 8/2007 | Frolund et al. |
| 2008/0189240 | A1 | 8/2008 | Mullins et al. |
| 2010/0070698 | A1 | 3/2010 | Ungureanu et al. |
| 2010/0082553 | A1 | 4/2010 | Beatty et al. |
| 2010/0121821 | A1 * | 5/2010 | Kinoshita .............. G06Q 30/06 707/661 |
| 2010/0169288 | A1 | 7/2010 | Brown |
| 2010/0268820 | A1 | 10/2010 | Shi et al. |

* cited by examiner

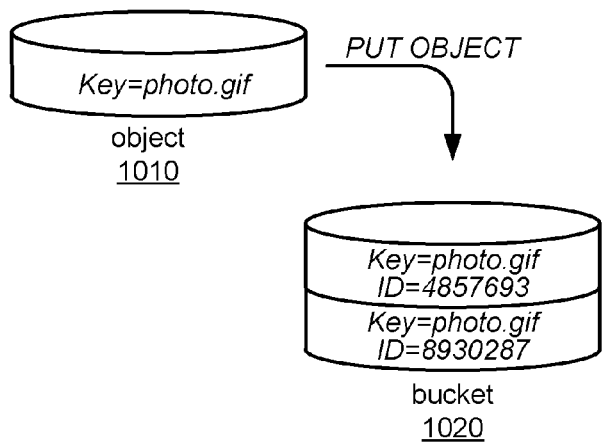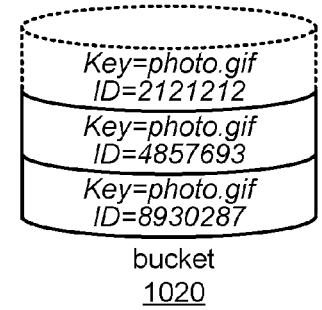
FIG. 10A            FIG. 10B
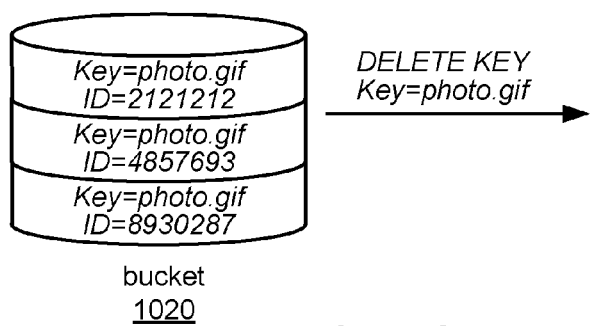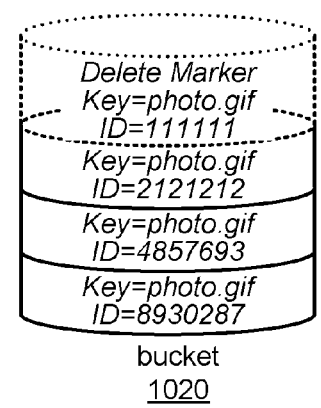
FIG. 10C            FIG. 10D
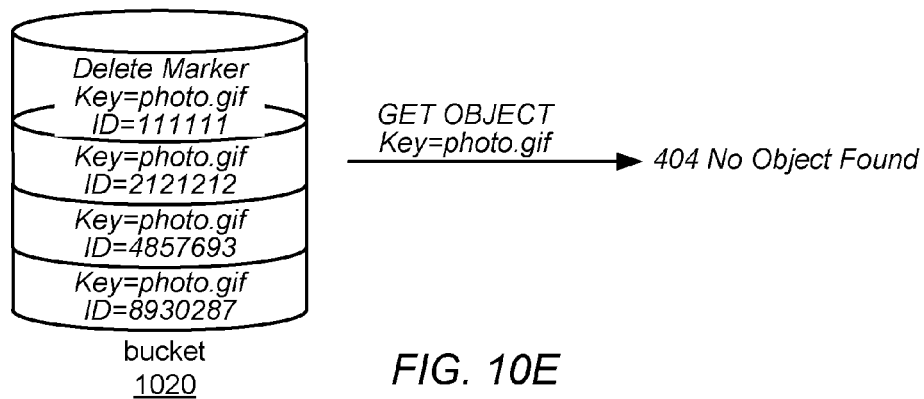
FIG. 10E

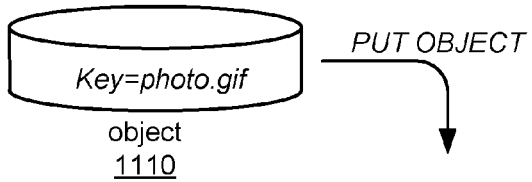
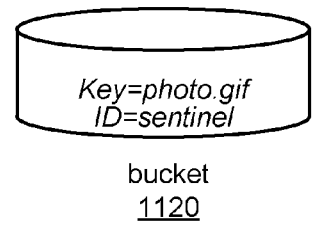
FIG. 11A    FIG. 11B
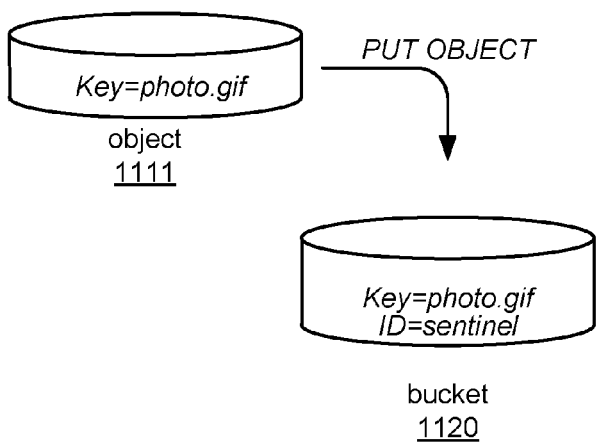
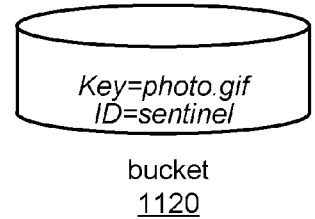
FIG. 11C    FIG. 11D
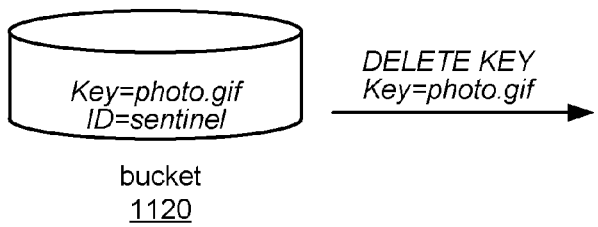
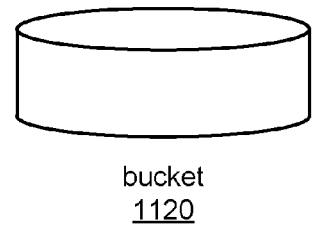
FIG. 11E    FIG. 11F key map 1200 → | A#2 | A#3 | A#4 | B#2 | B#3 | B#4 | C#2 | C#3 | C#4 |

*FIG. 12A* key map 1200 → | A#2 | A#3 | A#4 | B#1 | B#2 | B#3 | B#4 | C#2 | C#3 | C#4 |

*FIG. 12B* key map 1200 → | A#2 | A#3 | A#4 | B (sentinel) | B#1 | B#2 | B#3 | B#4 | C#2 | C#3 | C#4 |

*FIG. 12C*

SYSTEM AND METHOD FOR LOGICAL DELETION OF STORED DATA OBJECTS

This application is a continuation of U.S. patent application Ser. No. 14/992,915, filed Jan. 11, 2016, now U.S. Pat. No. 9,563,578, which is a continuation of U.S. patent application Ser. No. 14/673,808, filed Mar. 30, 2015, now U.S. Pat. No. 9,235,476, which is a divisional of U.S. patent application Ser. No. 13/953,447, filed Jul. 29, 2013, now U.S. Pat. No. 8,996,831, which is a divisional of U.S. application Ser. No. 12/886,757, filed Sep. 21, 2010, now U.S. Pat. No. 8,504,758, which are hereby incorporated by reference herein in their entirety.

BACKGROUND

Although some storage systems support the storing of multiple versions of a file, they typically do not provide version-aware operations other than those used to support fairly simple backup and recovery services. In general, currently available storage services, and their underlying storage systems, do not support other use models that may require more access to, and/or control over, multiple versions of a file or other stored data.

Online and other remote data storage services have become widely available in recent years. In a typical model, a storage service may provide storage for backup data, which may be retrieved in the event of a hardware failure, an accidental deletion of data, or data loss as a result of a security breach or other malicious act. Storage services may also provide long-term remote storage for archival or historical purposes.

BRIEF DESCRIPTION OF THE DRAWINGS

FIGS. 10A-10I illustrate the effects of various operations on a versioning-enabled bucket in a storage system that supports versioning, according to one embodiment.

FIGS. 11A-11M illustrate the effects of various operations on a bucket when a versioning feature is off, enabled, or suspended, according to one embodiment.

FIGS. 12A-12C illustrate the ordering of elements in a key map, according to some embodiments.

Figure 1:
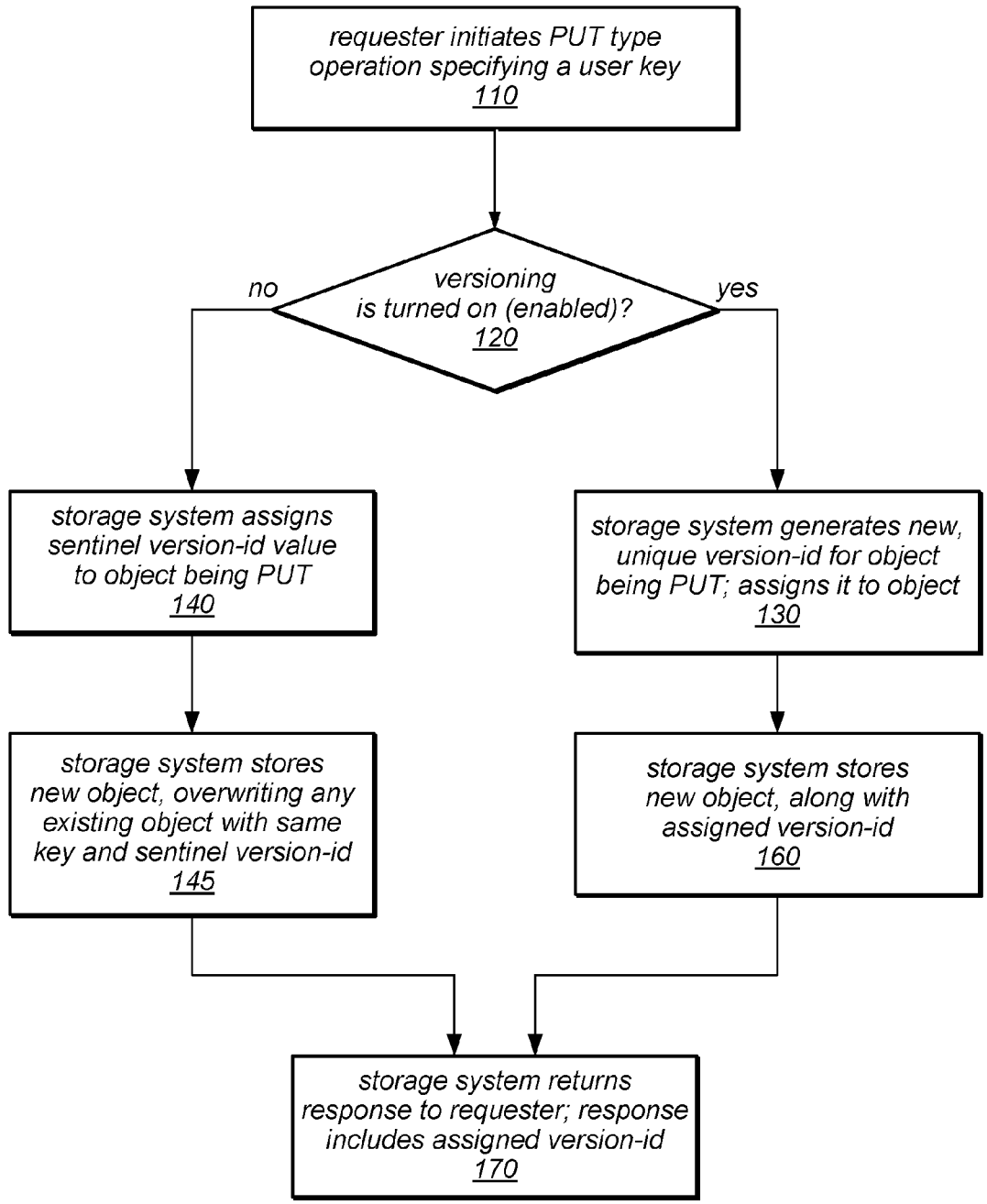
FIG. 1 is a flow diagram illustrating a method for storing a data object in a storage system that supports versioning, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

The systems and methods described herein may provide support for storing multiple versions of an object and a variety of use cases that depend on such versioning support. In some embodiments, object versioning may be selectively enabled or suspended (e.g., by a data owner or privileged user) by toggling the versioning state of a collection of stored objects. The storage systems described herein may provide a simple interface that can be used to store and retrieve object data from a single stored version of an object or from any of a series of versions of the object. The systems and methods described herein for supporting storing multiple versions of a data object may in some embodiments allow for more control over the versions of objects than previous storage systems. In some embodiments, a storage system may be instructed to store multiple value versions of each object that is identified by a unique key. The systems and methods described herein may allow users (e.g., storage service subscribers) and/or client applications (e.g., tools) to store, retrieve and/or delete objects without knowing (or needing to know) the versioning state of the targeted collection of stored objects. However, a data owner (or privileged user) may (at various points) decide to enable versioning on a given collection of stored objects, e.g., in order to support the recovery of deleted data.

The methods described herein may protect users from accidental overwrite, logical corruption, and unintended deletion, and may allow users to access a sequence of changes to the value (i.e. changes to the object data, or content) of an object over time. In some embodiments, each stored object may include two identifying components: a key and a version identifier (or "version-id"). In such embodiments, the combination of a key and a version-id may uniquely identify an object in a bucket. Objects in the same bucket that have the same key but different version-ids may be referred to as versions of one another, object versions of the key, or simply versions of the key. In some embodiments, the versioning techniques described herein may enable multiple versions of an object to be stored in the same bucket. In various embodiments, the methods described herein may be employed in local or remote storage systems, including systems that provide storage services to users (e.g., subscribers) over the Internet.

The following concepts and terms may be used herein to describe systems and methods that support data object versioning, according to various embodiments:

Bucket—A bucket is a logical container in which objects may be stored in a storage system on behalf of a user. In some embodiments, every object may be contained in a bucket, and every object may be addressable using a combination of a bucket identifier and one or more identifiers of the object itself.

Object—Objects are the fundamental entities stored in a storage system. In some embodiments, the stored objects may include object data and/or metadata. For example, each object may include a data object portion, and a metadata portion (which may include default metadata and/or versioning related metadata). As noted above, in some embodiments, an object may be uniquely identified within a bucket by the combination of a user key (e.g., an object name) and a version identifier (or version-id).

Key—A key is an identifier for an object within a bucket. In some embodiments, every object in a bucket may have exactly one key, and the combination of a bucket, key, and version identifier may uniquely identify each object stored in the storage system.

In some embodiments, the data object portion of an object may be opaque to the storage system, i.e. it may be treated as a "black box" entry by the storage system. In various embodiments, the default metadata of an object may include, e.g., a name-value pair, the date the object was last modified, and/or an indicator of the content type (i.e. the data type of the contents of the data object portion of the object). In some embodiments, the metadata associated with an object may include system interjected key-value pairs (containing, for example, a creation date and/or a last modified date), along with user supplied key-value pairs. Examples of versioning related metadata are described in more detail below, according to various embodiments. In some embodiments, metadata associated with and/or stored in an object may include an access control list (ACL). In some embodiments, a developer may be able to specify custom metadata at the time an object is stored. In various embodiments, the amount of metadata that can be associated with a given object may be restricted by the limits of the interface used, and/or the amount of data allowed or supported by the system for a request or response message.

In various embodiments, the storage systems described herein may include support for the following storage related tasks:

Create buckets—create and name a bucket that stores data and/or metadata in objects.

Store data in buckets. In various embodiments, each object may be stored and retrieved using a unique key, which may be assigned by the developer of the data or owner of the bucket. For example, when writing an object to the storage system, a user may specify a unique key in the namespace of a bucket owned by the user.

Retrieve data—In various embodiments, a user may retrieve his or her data (i.e. to read and/or download the contents of the objects that he or she owns) and/or may enable others to retrieve that data.

Permissions—In various embodiments, a bucket owner (and/or another privileged user who has the required permissions) may grant or deny access to others who want to upload data into or download data from a particular bucket.

Delete data—In some embodiments, a bucket owner (and/or another privileged user who has the required permissions) may delete some of the data stored in the bucket.

List stored objects—In various embodiments, a bucket owner (and/or another privileged user who has the required permissions) may request a list of some or all of the objects stored in the bucket.

As noted above and described in more detail herein, in some embodiments, a user may need to have special permission to be able to perform certain operations in the storage system. For example, a user may need to be designated as a privileged user in the system (and/or for a particular bucket in the system) in order to check a versioning state, modify a versioning state, delete objects and/or keys, retrieve logically deleted data, set permissions on buckets or objects thereof, etc. In some embodiments, such permissions may be automatically granted to and/or controlled by the bucket owner. In other embodiments, such privileges may be designated and/or granted to users by other means and/or based on factors other than bucket ownership. In various embodiments, some or all of these permissions may be granted and/or controlled on a bucket basis. In other embodiments, one or more of these permissions may be granted and/or controlled on an individual object basis, or on the basis of the object type or content type.

As noted above, in some embodiments, all objects may be uniquely identified by a key/version-id pair. In such embodiments, operations that retrieve data from objects, such as GET OBJECT, GET ACL, and COPY OBJECT operations defined by an Application Programming Interface (API), may accept an optional version-id input that identifies a particular version of an object from which to retrieve data. For each of these APIs, if a key is specified, but no version-id is specified, the system may be configured to automatically determine the version-id of the latest version of the object having the specified key, and to retrieve data from that version of the object (i.e. to automatically fill in the latest version-id for a specified key if no version-id is specified). In some embodiments, operations that create new objects, such as PUT OBJECT, PUT ACL, and COPY OBJECT operations defined by the API, may automatically generate a unique version-id (which may be a unique string) and assign it to the newly created object. In some embodiments, a version-id may be bound to an object for the lifetime of the object and can never be changed. In some embodiments, subsequent to the execution of a DELETE OBJECT operation that specifies a key, but not a version-id, attempts to retrieve an object having the specified key without specifying a version-id (e.g. using GET OBJECT, GET ACL, or COPY OBJECT operations) may return an error indication. Note, however, that in this case, the storage system may not have actually deleted any data objects, or the contents thereof. In some embodiments, in order to permanently delete an object version, a DELETE type request may need to specify both a key and a version-id.

Unlike in previous storage systems (e.g., systems in which all objects are versioned or systems that do not support any object versioning), in some embodiments of the storage systems described herein, users may be able to turn object versioning on and/or off for a given bucket over time. As described in more detail below, various operations performed on a bucket and/or on objects thereof may behave differently depending on whether versioning has been toggled on (i.e. is "enabled:) or is "off" (or "suspended") for the bucket. In other words, at least some of the actions taken to perform requested accesses may be dependent on whether object versioning is, or has ever been, enabled for the bucket. In such embodiments, the versioning state is an attribute associated with a bucket. In some embodiments, the versioning state may initially be "off", but may be toggled on (e.g., changed to the "enabled" state) by a privileged user or bucket owner, and may be subsequently toggled off again (e.g., changed to the "suspended" state) by a privileged user or bucket owner. As described in more detail below, toggling the versioning state of a bucket may change the default behavior of delete and store type operations. For example, when versioning is toggled on, store and delete type operations may not overwrite an object nor actually delete the object. However, toggling versioning off may not imply that all versions of an object are removed in response to a delete type operation or overwritten in response to a store type operation. Instead, it may mean that the storage system stops automatically creating new versions in response to mutating operations, such as these.

In some embodiments, users may elect to turn object versioning on after a bucket stores a given number of objects (e.g., one million objects). At that point, the objects already stored in the bucket may be accessible using standard APIs that allow them to be deleted and/or overwritten. However, in some embodiments, newly added objects within the bucket (i.e. objects that are PUT into the bucket after versioning has been enabled) cannot be overwritten and cannot overwrite the existing objects. In effect, the existing objects (those stored prior to versioning being enabled) may be thought of as implicit object versions that have version-ids with a special sentinel value (e.g., a null value, or some other pre-defined, reserved value). Note that the special sentinel value may in some embodiments have the useful property that its lexicographical value is less than that of every other valid version-id value. In some embodiments, after some use (e.g., after various versions of different objects are created and/or removed), the versioning feature may be turned off again, or suspended. At that point, accesses may proceed as they would have before versioning was enabled, and all of the versions of the objects may be addressable (e.g., as implicit object versions, or by specifying a version-id). The behavior of store type operations is described in more detail below, according to different embodiments.

In some embodiments, a newly created bucket may not have versioning enabled, but versioning may be enabled for the bucket at later time. In other words, the default versioning state of a newly created bucket may be that versioning is "off." In such embodiments, versioning may be enabled (e.g., at some point in the future) in order to provide recovery from unintended overwrites and deletions, or to archive objects so that multiple versions of them can be retrieved later. Before versioning is enabled for a bucket, the storage system may behave as if versioning were not supported in the system at all. For example, prior to enabling versioning for a particular bucket, the bucket may exhibit the following characteristics and behaviors: only one data object having a given key may exist in the bucket, a GET OBJECT operation may be used to retrieve an object that is stored in the bucket, a PUT OBJECT operation may be used to store an object in the bucket (and may overwrite an existing object with the same key), and a DELETE OBJECT operation may be used to remove the object. In some embodiments of a system that supports versioning, if versioning is not enabled for a particular bucket (i.e. if the versioning state is "off" or "suspended"), objects stored in that bucket may be assigned a special sentinel version-id value. In some embodiments, if versioning is later enabled for the bucket, the objects already stored in the bucket (i.e. those stored in the bucket while versioning was off or suspended) may be unchanged. For example, the version-id value (i.e. the sentinel value), object data (i.e. contents), and permissions associated with any previously stored objects may remain the same as they were before versioning was enabled.

The most common access pattern for a storage system may be a request to access the latest version of an object (i.e. the latest version of an object having a specific user key). A naïve implementation of such an access in a system that supports the toggling of versioning state may require that a symbolic link be generated linking an access request to a user key that does not include a version-id (i.e. a non-versioned access) to a specific version of the object having the specified user key. Such a link may be thought of as a pointer that maps a "key K with no version specified" to "key K with version V". Creation and maintenance of such pointer/link entities may have a negative impact on the performance and/or scalability of the storage system. For example, in systems that rely on pointer/link entities, in order to migrate stored objects from a storage system (or bucket thereof) for which versioning is not supported to a storage system (or bucket) for which versioning is supported, a unique version-id may need to be generated for and assigned to each and every pre-exiting object in the storage system or bucket, and a pointer to the latest version of each object may need to be created and maintained as other versions are added to and/or deleted from the storage system or bucket.

The systems and methods described herein may in various embodiments provide "latest version" support without the need to explicitly generate such symbolic links, and without relying on locking data objects and/or versions thereof. This may in some embodiments allow the system to maintain simple access to objects, and to maintain backwards compatibility in the semantics and implementation of the system for customers who choose not to enable object versioning, or choose to delay its adoption for their buckets. Because of these requirements, and because many object versions may exist in the storage system or a bucket thereof for a given key, the users may need to disambiguate which version that they want to get, copy, or delete by providing a specific version identifier for any accesses to that key. However, requiring this in all cases may complicate accesses to stored objects (e.g., accesses made via a web browser in a web-based storage service use-case). Instead, the systems described herein may provide latest version support by an extension of the underlying data structure in which data and metadata of various objects are stored and through the use of a FIND NEAREST operation defined by the API such that a version-id may not need to be specified for all accesses to objects stored in the system.

In some embodiments, the version-ids described herein may include sequencers with the property that the most significant bytes of the version-id (i.e. a sequencer portion) encode the time at which the version-id was generated. In one example, the sequencer may encode a value representing the difference between a predetermined time in the distance future and the time at which the sequencer (or version-id) was created. In some embodiments, the system may store objects that include a series of version-ids (or sequencers thereof) that has a total ordering across all sequencers. In such embodiments, the result of a comparison of the version-ids of the stored objects may be the same as the result of a comparison of the times at which the version-ids (or sequencers thereof) were created. In some such embodiments, a FIND NEAREST operation specifying a given user key, may return either the first key-value pair in the total ordering of key-value pairs that includes the given user key, or the next key-value pair in the total ordering of key-value pairs.

In some embodiments, a single Unicode data point (e.g., the null character or another pre-defined, reserved character) may be introduced into the version-id as a delimiter character to connect a user key with the sequencer. In such embodiments, sequences of <key, value> pairs (for which the key may be a composite key consisting of a user key, followed by a connector or delimiter character, followed by a version-id) may be stored within a data structure, e.g., in a key map, to reflect an overall ordering of objects in a particular bucket. Note that in some embodiments, the chosen delimiter character may not be allowed in a user-specified key, or in any user-specified portion of the composite key described above. However, in some such embodiments, this character may be used by the storage system for internal operations, as described herein. In some embodiments, the version-id for each explicit object version may include a sequencer portion and an ID portion, while the version-id for an implicit object version may be a special sentinel value. In some embodiments, the ID portion of a version-id for an explicit object version may be generated by the system (e.g., randomly, or using another suitable approach), and may be unique to the target bucket and/or the namespace for the specified user key. In other embodiments, the ID portion may be assigned by a data owner or privileged user, and may be required to be unique to the target bucket and/or the namespace for the specified user key. In some embodiments, the ID portion may be a globally unique identifier (GUID). For example, in some embodiments, the composite key for an explicit object version may be of the form shown below, and the combination of the sequencer and the ID portion may be referred to collectively as the version-id for the explicit object version.

[bucket/user key] [version delimiter] [sequencer] [ID]

In one example, the version delimiter for a composite key may be a null character (e.g., 0x00), and the version-id may comprise 16 bits (e.g., 8 bits for the sequencer portion and 8 bits for the ID portion). Other numbers and combinations of delimiters (or delimiter bits), sequencers (or sequencer bits), and identifiers (or identifier bits) may be included in a composite key, in other embodiments. The use of the composite key described above, along with a FIND NEAREST operation, may in some embodiments provide a way for a storage system to automatically ascertain the version-id of (and access) the latest object version for a key in constant time and without adding any additional indirection. Thus, in some embodiments the number of input/output operations required to put, get and/or delete keys in systems that support the toggling of versioning state and APIs that may or may not include a version-id may not be significantly different than the number of input/output operations used in standard accesses to keys in systems that do not support versioning or the toggling of versioning state. In other words, the systems described herein may efficiently determine the latest version of an object, so that the performance of an operation to identify and retrieve the latest version of an object (i.e. when the version-id not specified) may be essentially the same as the performance of an operation to retrieve any arbitrary object version when the version-id is specified. By contrast, naïve link implementation approaches, such as that described above, may double the cost of such accesses in many, if not most, situations.

As described in more detail below, the efficient logical deletion of an object may be supported in the underlying data structure of the storage systems described herein by the inclusion of object versions called "delete marker objects", or simply "delete markers". For example, in some situations, a user may wish to block or limit access to some or all versions of a key without removing the key or its associated data from the storage system and/or bucket in which it is stored. In some embodiments, the system described herein may create delete markers within the data structure to denote the logical deletion of the key. In such embodiments, the objects having the specified key may not actually be removed from the bucket in which they are stored, and may still be addressable and/or their contents may still be accessible (e.g., to the bucket owner and/or another privileged user).

As described herein, a delete marker is a special type of object version that may have no data associated with it. In some embodiments, a delete marker may be used to indicate that an object having the same user key as the delete marker has been logically deleted. As described in more detail below, a delete marker may be created by the storage system in response to a DELETE OBJECT operation that specifies only a user key and not a version-id. This newly created delete marker may be the latest version of the key specified in the DELETE OBJECT operation. Note that in some embodiments, multiple delete markers may be created for a given key, as described in more detail below.

Delete markers are unique in some ways, but may be treated the same as other entries in the underlying data structure by most components of the storage system. The use of delete markers may provide the added benefit of supporting simple object lineage, and may allow users to track object creation, object overwrite, object delete, and object re-creation use cases. Being able to track object lineage, as in some embodiments, may be especially useful in certain security applications.

In various embodiments, delete markers may behave like other object versions in the following ways:
  Delete markers entries within the data structure may have the same size and impact on algorithmic running time as other object version entries.
  They may appear in the results of LIST VERSIONS operations.
  They may have an associated user key and version-id.
  They may be the "latest" version of a key.
  They may be explicitly deleted using their version-id.
  Only a user who has the required permissions (e.g., the bucket owner and/or another privileged user to whom such permissions have been granted) may delete a delete marker stored in a given bucket.
  There may be a storage cost associated with them, e.g., in terms of the number of bytes in the bucket and key.
  They may need to be explicitly deleted in order to delete the bucket in which they are stored.
  They may have an owner (e.g., the requester that performed the DELETE OBJECT operation that created them).
  They may have a "last modified" date.

In various embodiments, delete markers may be different from other object versions in the following ways:
  They may not have data associated with them.
  They may not have an ACL (e.g., because an ACL may have data associated with it).
  Only requesters with permission to access delete markers in the bucket in which they are stored may learn of their existence (e.g., using a LIST VERSIONS operation, as described in more detail below).

A user may not be able to explicitly retrieve them, because they have no value.

The result of such an attempt may be the return of an error indication.

A DELETE VERSION type operation (such as one defined by an API) may be the only operation described herein that can be applied to operate on (rather than merely expose the existence of) a delete marker.

A delete marker may mark the logical deletion of an object, and may be used to support end-user logical deletion as well as undelete operations. In some embodiments, the use of delete markers may protect users from various accidental deletion scenarios.

As noted above, the systems described herein may include operations (e.g., as defined by an API) that support and understand object versioning, some of which may behave differently depending on the current (and/or past) versioning state of a targeted bucket. For example, in some embodiments, an operation for storing a data object in the system (e.g., a PUT OBJECT operation) may guarantee that the object will never be overwritten, and that only a privileged user with permission to delete specific object versions in the buckets in which it is stored (e.g., using a delete type operation that specifies its version-id) can delete it. This API may further guarantee that a store type operation will never overwrite an existing object in a bucket. FIG. 1 is a flow diagram illustrating a method for using such an API to store a new data object in a data storage system that supports versioning, according to one embodiment. As illustrated at 110, the method may include initiating a PUT type operation that specifies a user key. For example, a requester (e.g. a user, user application, or process) may issue a PUT OBJECT instruction to a shared storage system or storage service, and that PUT OBJECT instruction may conform to an API similar to those described herein. The PUT OBJECT instruction may be issued to request that a particular data object be stored in a bucket that is owned by the requester (e.g., a bucket owned by a user who is a storage service subscriber), and/or that is currently being accessed. In response to receiving the request (i.e. via the PUT instruction), the storage system may assign a version identifier (version-id) to the new data object and may store the new data object in the bucket, as described in more detail below. Note that in some embodiments, if the requester does not have permission to modify the contents of the bucket, the storage system may return an error indication in response to an attempt to perform this operation (not shown).

As illustrated in this example, if versioning is enabled for the bucket into which the new data object is to be stored (i.e. if the versioning state of the target bucket is "enabled"), shown as the positive exit from 120, the method may include the storage system generating a new, unique version-id for the new data object, and assigning that version-id to the new data object, as in 130. The storage system may then store the new data object in the target bucket, along with its assigned version-id, as in 160.

If versioning is not enabled for the bucket (i.e. if the versioning state of the bucket is "off" or "suspended"), shown as the negative exit from 120, the method may include the storage system assigning a special sentinel version-id value to the new data object, as in 140. The storage system may then store the new data object in the target bucket, along with its assigned version-id (the sentinel value), as in 145. As illustrated in this example, if the bucket already stores an existing data object having the same key as the new data object and that existing data object has the sentinel version-id value, storing the new data object may include overwriting the existing data object that has the same key and the sentinel version-id value.

As illustrated at 170 in FIG. 1, the storage system may return a response to the requester indicating whether the PUT operation was successful (i.e. whether the data object was successfully stored in the target bucket). As illustrated in this example, the version-id assigned to the data object in response to the PUT operation may be included in the response returned to requester. For example, in some embodiments, the assigned version-id may be included in a header element in the response. Again note that if the versioning state of a bucket is "off" or "suspended" at the time that the PUT operation is issued, the storage system may assign a sentinel version-id value to the data object being PUT. Note that in some embodiments, if a requester attempts to specify a version-id for a PUT operation, the storage system may return an error indication (e.g., 405 Method Not Allowed, or similar).

In some embodiments, when an object is stored in a bucket, metadata about the object may be stored in a data structure (e.g., a key map) associated with the bucket. This metadata may indicate the user key, version-id value, and a creation/modification date. For example, in some such embodiments, when a new object is created, a time stamp corresponding to the date and time at which the new object is created may be stored as a creation/modification date for that object in a key map element associated with the object. If the object is an implicit object version (e.g., one with the special sentinel version-id value), the creation/modification date in the key map element associated with the object may be updated when (and if) the implicit object version is overwritten by a subsequent store operation (e.g., as shown at 145 in FIG. 1).

In various embodiments, data objects stored in the system may be retrieved using a GET OBJECT operation. This API may behave the same irrespective of whether versioning is enabled, off, or suspended for the targeted bucket. In some embodiments, the requester may need to have permission to access the object version being retrieved in order to perform this operation. This may be true even if a version-id is not specified in the request. In this case the requester may need to have permission to access the latest object version for the key specified in the request (i.e. the object version corresponding to the most recent key/version-id pair in lexicographic order).

Figure 2:
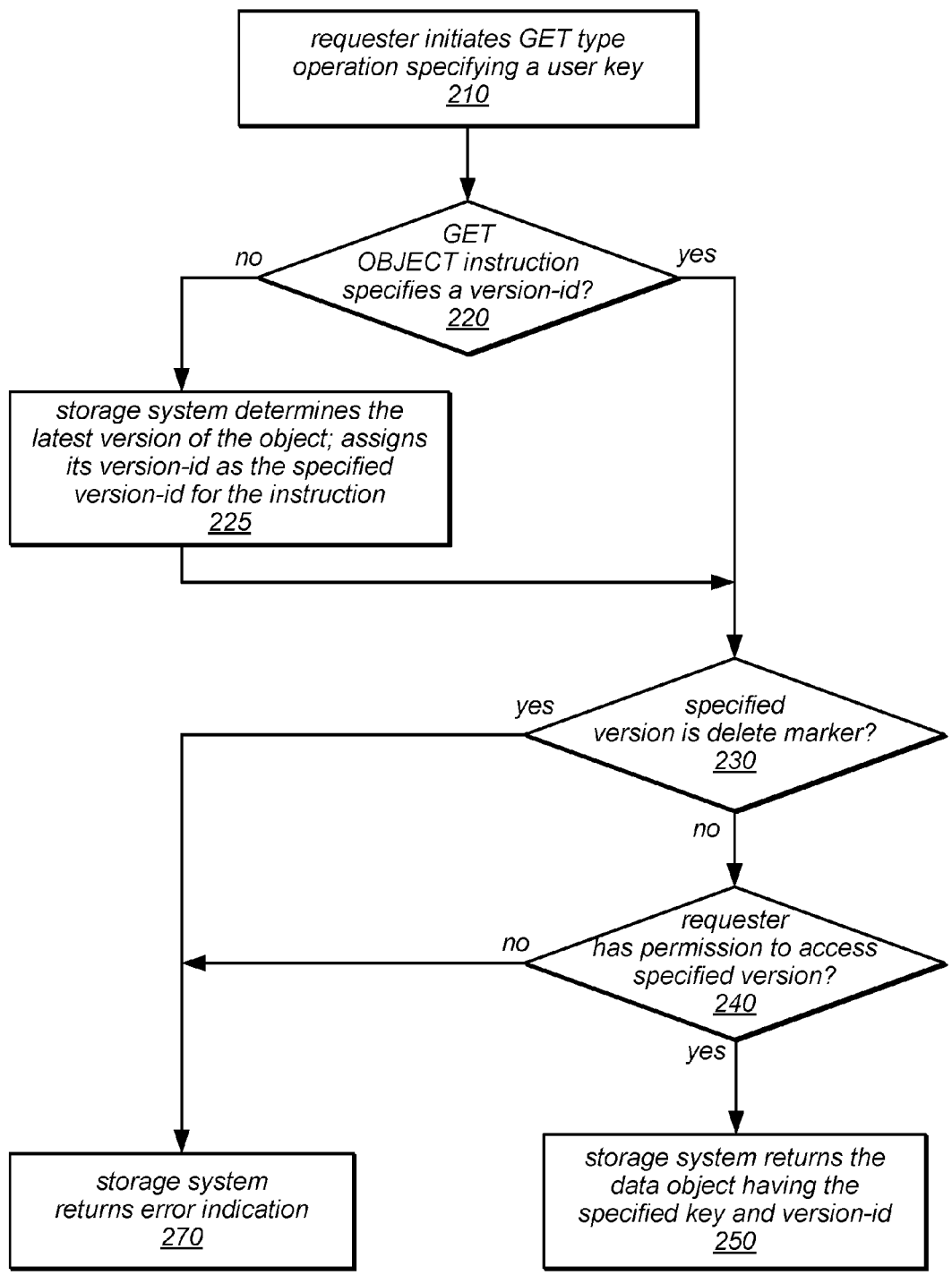
FIG. 2 is a flow diagram illustrating a method for retrieving a data object from a storage system that supports versioning, according to one embodiment.

FIG. 2 is a flow diagram illustrating a method for retrieving a stored data object from a data storage system that supports versioning, according to one embodiment. As illustrated at 210, the method may include a requester (e.g. a user, user application, or process) initiating a retrieve type operation that specifies a user key. For example, the requester may issue a GET OBJECT instruction to a shared storage system or storage service, and that GET OBJECT instruction may conform to an API similar to those described herein. The GET OBJECT instruction may be issued to request that a particular data object be retrieved from a bucket that is owned by the requester (e.g., a bucket owned by a user who is a storage service subscriber), and/or that is currently being accessed. In response to receiving the request (i.e. via the GET OBJECT instruction), the storage system may return the data object specified in the request, as described in more detail below.

As illustrated in this example, if the GET OBJECT instruction does not specify a version-id, shown as the negative exit from 220, the method may include the storage system determining the latest version of the data object having the specified user key (e.g., using a FIND NEAREST operation), as in 225, and assigning its version-id as the specified version-id for the GET OBJECT instruction. Note that in some cases the data object version that is determined to be the latest version by the operation illustrated at 225 may not be latest version of the object by the time one or more of the subsequent operations illustrated in FIG. 2 are performed. However, the data object version that was determined to be the latest version at 225 may be the target of the GET OBJECT operation for the remainder of the GET OBJECT process illustrated in FIG. 2.

As illustrated in this example, the method may include determining whether the specified version is a delete marker, as in 230. If so, shown as the positive exit from 230, the storage system may return an error indication to the requester, as in 270. If the specified version is not a delete marker, shown as the negative exit from 230, the method may include the storage system determining whether the requester has permission to access (i.e. to view and/or retrieve) the specified version, as in 240. If not, shown as the negative exit from 240, the storage system may return an error indication to the requester, as in 270. If the requester has permission to access the specified version, shown as the positive exit from 240, the method may include the storage system returning the stored data object that has the specified user key and the specified version-id, as in 250. Note that the error indication returned if the requested version is a delete marker may be different than the error indication returned if the requester does not have permission to access the specified version, in some embodiments. Note also that if the requested object version does not exist (not shown), yet another error indication may be returned. For example, in some embodiments, each error indication returned by the storage system may include a text string describing the applicable error condition(s). In some embodiments, the requester may only be able to learn about the existence of delete markers if the requester has permission to access delete markers the target bucket or to list all object versions in the target bucket. In this case, the error indication may include an indication (e.g., in the header) that the specified version is a delete marker. Again note that the GET OBJECT instruction may behave the same whether the current versioning state of the targeted bucket is "enabled", "off", or "suspended" at the time that the GET OBJECT instruction is issued, in some embodiments.

In some embodiments, a copy type operation may behave like a retrieve type operation followed by a store type operation, and may behave in the same way that the retrieve and store type operations behave with respect to the current (and/or past) versioning state of a targeted bucket. For example, a request to perform a COPY OBJECT operation may include a specific version-id along with the user key (i.e., the requester may specify a key/version-id pair) as the source object (i.e. the object to be copied), or may specify only the user key. If only the user key is specified for the source object, the storage system may automatically determine the latest version-id for that key, as described herein. In some embodiments, a request to perform a COPY OBJECT operation may include a destination user key to be associated with the copy of the data object when it is stored in the destination bucket. As with the PUT type operation described above, this API may cause the storage system to automatically generate a unique version-id for the destination object if versioning is enabled for the destination bucket. If versioning is off or suspended for the destination bucket, the API may cause the storage system to use the sentinel version-id value for the copied object. In some embodiments, if the requester attempts to specify a version-id for the destination object, the storage system may return an error indication (e.g., 405 Method Not Allowed, or similar).

Figure 3:
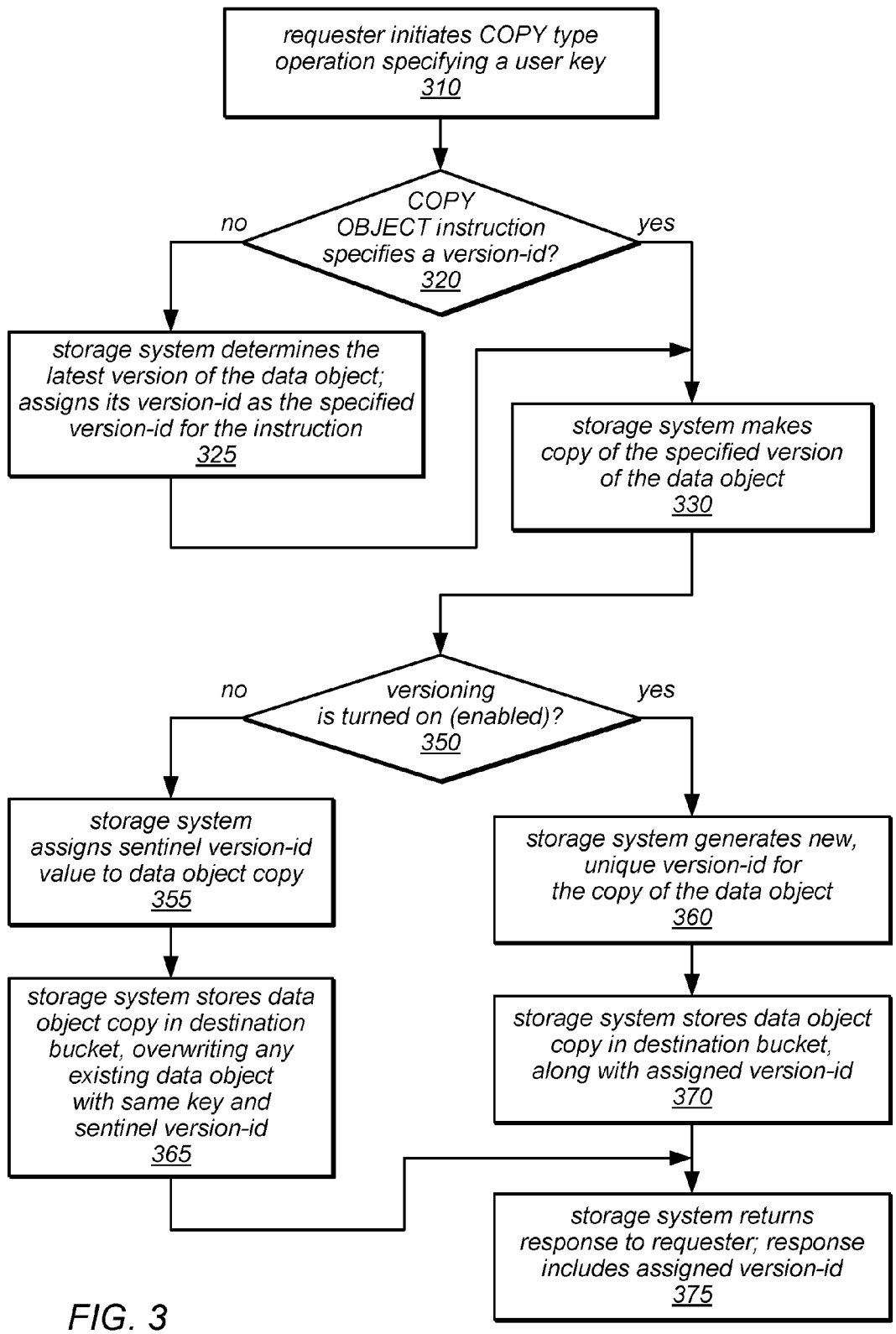
FIG. 3 is a flow diagram illustrating a method for copying a data object that is stored in a storage system that supports versioning, according to one embodiment.

FIG. 3 is a flow diagram illustrating a method for copying a data object that is stored in a storage system that supports versioning, according to one embodiment. As illustrated at 310, the method may include a requester (e.g. a user, user application, or process) initiating a COPY operation that specifies a user key. For example, the requester may issue a COPY OBJECT instruction to a shared storage system or storage service, and that COPY OBJECT instruction may conform to an API similar to those described herein. The COPY OBJECT instruction may be issued to request that a particular data object be retrieved from a bucket that is owned by the requester (e.g., a bucket owned by a user who is a storage service subscriber), and/or that is currently being accessed, and that a copy of that data object be stored in the bucket. In response to receiving the request (i.e. via the COPY OBJECT instruction), the storage system may retrieve the data object specified in the request from the bucket and store a new copy of that data object in the same bucket or (if a different destination bucket is specified) in a different bucket, as described in more detail below. As noted above, in some embodiments, a request to perform a COPY OBJECT operation may include a destination user key to be associated with the new copy of the data object when it is stored in the destination bucket. Note that in some embodiments, the requester may need to have permission to view and/or retrieve objects in the source object (i.e. the data object to be copied) and permission to modify the contents of the destination bucket in order to perform this operation. In such embodiments, if the storage system determines that the requester does not have permission to view or retrieve the specified version or does not have permission to modify the contents of the destination bucket, the storage system may return an error indication (not shown). In addition, in some embodiments, the storage system may determine whether the specified version is a delete marker, and, if so, may return an error indication (not shown).

As illustrated in this example, if the COPY OBJECT instruction does not specify a version-id, shown as the negative exit from 320, the method may include the storage system determining the latest version of the data object having the specified user key (e.g., using a FIND NEAREST operation), as in 325, and assigning its version-id as the specified version-id for the COPY OBJECT instruction. Again note that in some cases the data object version that is determined to be the latest version by the operation illustrated at 325 may not be latest version of the object by the time one or more of the subsequent operations illustrated in FIG. 3 are performed. However, the data object version that was determined to be the latest version at 325 may be used as the source of the COPY OBJECT operation for the remainder of the COPY OBJECT process illustrated in FIG. 3. In this example (assuming the requester has permission to view and/or retrieve the specified version, and the specified version is not a delete marker), the method may include the storage system making a copy of the specified version of the data object, as in 330. If the latest version of the data object is a delete marker, the method may instead include the storage system returning an error indication (not shown).

As illustrated at 350, if versioning is enabled for the bucket into which the copy of the data object is to be stored (i.e. if the versioning state of the destination bucket is "enabled"), shown as the positive exit from 350, the method may include the storage system generating a new, unique version-id for the copy of the data object, and assigning that version-id to the data object copy, as in 360. The storage system may then store the data object copy in the destination bucket, along with its assigned version-id, as in 370.

If versioning is not enabled for the destination bucket (i.e. if the versioning state is "off" or "suspended"), shown as the negative exit from 350, the method may include the storage system assigning a sentinel version-id value to the copy of the data object, as in 355. The storage system may then store the data object copy in the destination bucket, along with its assigned version-id (the sentinel value), as in 365. As illustrated in this example, if the destination bucket already stores an existing data object having the same key as the data object copy and that existing data object has the sentinel version-id value, storing the new data object in the destination bucket may overwrite the existing data object that has the same key and the sentinel version-id value.

As illustrated at 375 in FIG. 3, the storage system may return a response to the requester indicating whether the COPY operation was successful (i.e. whether the particular data object was successfully copied and the data object copy stored in the destination bucket). As illustrated in this example, the version-id assigned to the data object copy in response to the COPY OBJECT instruction may be included in the response returned to the requester. For example, in some embodiments, the assigned version-id may be included in a header element in the response. As illustrated in FIG. 3, the COPY OBJECT instruction may in some embodiments behave differently when the current versioning state of the destination bucket is "enabled" than when the current versioning state is "off", or "suspended" at the time that the COPY OBJECT instruction is issued, while the current versioning state of the source bucket may not affect the behavior of the COPY OBJECT instruction.

The systems described herein may in some embodiments support multiple operations for listing the contents of a bucket. For example, one operation defined by the API (e.g., a LIST BUCKET operation) may behave in a manner similar to that of a corresponding operation in existing storage systems that do not support data object versioning. Such an API may be used to list only the versions of stored data objects that can be retrieved without specifying a version-id for the data objects. For example, such an API may cause the storage system to return a list of the latest version of each data object stored in the bucket unless the latest version of a data object is a delete marker. In this example, if the latest version of a data object were a delete marker, no data objects listed in the response would have the same user key as the delete marker. In some embodiments, this operation may support prefix and/or delimiter narrowed listing, or limiting the result set to a maximum number of keys.

Another operation defined by the API (e.g., a LIST VERSIONS operation) may be used to list all of the versions of the data objects stored in a given bucket, rather than only the versions of stored data objects that can be retrieved without specifying a version-id for the data objects. For example, such an API may cause the storage system to return a list of every version of each data object stored in the bucket, including any versions of stored data objects that are delete markers. In this example, if one of the versions of a data object were a delete marker, the delete marker would be included in the data objects listed in the response. As with the GET BUCKET operation described above, this operation may support prefix and delimiter narrowed listing, limiting the result set to a maximum number of keys, and a pagination/marker mechanism.

As noted above, in some embodiments, a data structure (e.g., a key map) may store metadata about the objects contained in a storage system or in a bucket thereof. For example, in some embodiments, a key map for a particular bucket may include a collection of inodes, each of which represents an object stored in the bucket. Each inode may include metadata associated with the object it represents, and this metadata may indicate (e.g., directly or through any of various encoding schemes) its user key, version-id, and creation/modification date. The order of the inodes in a key map may reflect a total ordering for the objects in a bucket, e.g., based on the user keys and version-ids of the objects in the bucket. For example, in some embodiments, the inodes may be sorted first by user key (e.g., lexicographically), and then by version-id. In some such embodiments, the object versions returned by a LIST VERSIONS operation may be ordered first in ascending lexicographic order of their keys (e.g., in alphabetical order, A to Z), and then in descending order of their creation dates (i.e. with the latest version listed first). Several examples of key maps are illustrated in FIGS. 12A-12C, and described in more detail below. The use of key maps in determining the latest version of an object is also described in more detail below.

As noted above, both object versions with data and object versions that are delete markers may be included in the list of objects returned to the requester. In some embodiments, each entry in the returned list of objects may include an indication of whether or not it is the latest version for its key. Again note that the operations that retrieve object data may automatically fill in the latest version-id for the specified key if no version-id is specified. Various parameters that may be supported by a LIST VERSIONS operation include:

- Prefix—If specified, this parameter may limit the responses to keys that begin with the indicated prefix. Prefixes may be used to separate the contents of a bucket into different sets of keys in a manner similar to the way that a file system uses folders.
- Delimiter—If specified, this parameter may cause keys that contain the same string between the prefix and the first occurrence of the delimiter to be rolled up into a single result element in a "common prefixes" collection, and these rolled-up keys may not be returned elsewhere in the response.
- Max keys—If specified, this parameter may indicate the maximum number of keys to be included in the result (e.g., in the body of the response). In some embodiments, if a value of this parameter is not specified in the request, a default value may be applied by the storage system.
- Key marker—If specified, this parameter may indicate a point in the bucket at which to begin listing. In various embodiments, a key marker may be used with or without a version-id marker.
- Version-id marker—If this parameter is specified, it may, in combination with a key marker, indicate the point in the bucket at which to begin listing.

In some embodiments, if the number of objects that could be returned for a LIST VERSIONS request exceeds the number specified by the max keys parameter (e.g., 1000), the LIST VERSIONS response may indicate that the returned list has been truncated. In some embodiments, the LIST VERSIONS response may include an indication of the next key marker and next version-id marker, and these may be included in a subsequent LIST VERSIONS request (e.g., the next request) in order to continue listing the remaining object versions in the target bucket.

Figure 4:
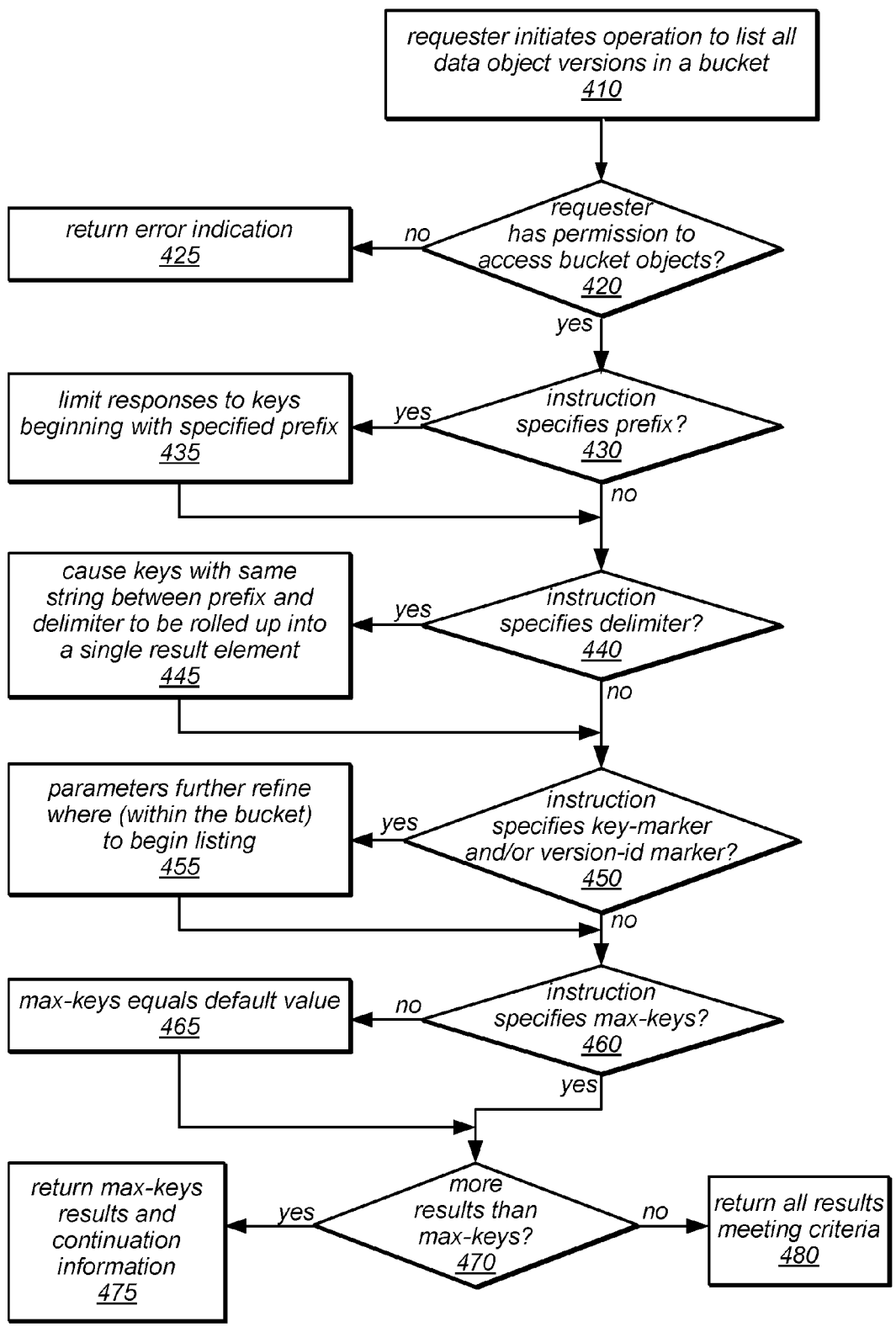
FIG. 4 is a flow diagram illustrating a method for listing the versions of data objects stored in a storage system that supports versioning, according to one embodiment.

FIG. 4 is a flow diagram illustrating a method for listing all of the versions of the data objects stored in a given bucket in a storage system that supports versioning, according to one embodiment. As illustrated at 410, the method may include a requester (e.g. a user, user application, or process) initiating an operation to list all data object versions in a bucket. For example, the requester may issue a LIST VERSIONS instruction to a shared storage system or storage service, and that LIST VERSIONS instruction may conform to an API similar to those described herein. The LIST VERSIONS instruction may be issued to request a list of all data object versions stored in a bucket that is owned by the requester (e.g., a bucket owned by a user who is a storage service subscriber), and/or that is currently being accessed. In response to receiving the request (i.e. via the LIST VERSIONS instruction), the storage system may return a list of all data object versions stored in the bucket (including delete markers), as described in more detail below.

As illustrated in this example, the method may include the storage system determining whether the requester has permission to access (i.e. view and/or retrieve) the objects in the target bucket, as in 420. If not, shown as the negative exit from 420, the method may include the storage system returning an error indication, as in 425. If the requester has permission to access the objects in the target bucket, shown as the positive exit from 420, the storage system may respond to the request by determining the list of data object versions to be returned. For example, if the LIST VERSIONS instruction specifies a prefix, shown as the positive exit from 430, the storage system may limit the responses to data objects with user keys beginning with the specified prefix, as in 435. Similarly, if the LIST VERSIONS instruction specifies a delimiter, shown as the positive exit from 440, the storage system may cause data objects with keys having the same string between any specified prefix and the delimiter to be rolled up into a single result element, as in 445.

As illustrated in FIG. 4, if the LIST VERSIONS instruction specifies a key marker and/or version-id marker, shown as the positive exit from 450, these parameters may specify at what point in the lexicographical ordering of the stored objects the storage system is to begin listing the data object versions in the target bucket, as in 455. In some embodiments, if a key marker and a version-id marker are specified, the list returned by the storage system may only include objects that come after the specified (key marker, version-id) pair in the defined ordering. For example, if the request specifies a key marker value of "key2", the response may begin with an entry for which the key comes lexicographically after the specified key marker (e.g., "key3"). In another example, if the request specifies a values for a key marker of "key2" and a version-id marker of "11223344", the response may begin with the first entry that comes after the data object corresponding to the specified key/version-id pair in lexicographic order. Note that the version-id marker may be specified as the sentinel value. In this case, the response may begin with the first entry that comes after an implicit version of a data object having the specified key. In some embodiments, if a key marker is specified, but a version-id marker is not specified, the list returned by the storage system may only include objects for which the corresponding key comes at or after the specified key marker (according to the defined ordering). As noted above, if the LIST VERSIONS instruction does not specify a value for max-keys, shown as the negative exit from 460, the storage system may use a default value for max-keys when returning the list of data object versions in the target bucket, as in 465.

If the storage system determines that there are no more data object versions in the bucket meeting the criteria specified by the LIST VERSIONS instruction than the number specified by max-keys, shown as the negative exit from 470, the method may include the storage system returning all of the results meeting the specified criteria, as in 480.

If the storage system determines that there are more data object versions in the bucket that meet the criteria specified by the LIST VERSIONS instruction than the number specified by max-keys, shown as the positive exit from 470, the method may include the storage system returning only the number of results equal to the value of max-keys, as in 475. Note that in some embodiments, if not all of the results can be returned due to the max-keys limit, the storage system may return continuation information (e.g., a key marker and/or version-id marker) reflecting the point at which the results were truncated. In some embodiments, a subsequent LIST VERSIONS operation may be invoked to retrieve additional results using that continuation information. For example, the values of some of the parameters described above may be specified in a subsequent LIST VERSIONS operation such that the results of the subsequent LIST VERSIONS operation include the next max-keys data object versions that would have immediately followed the results returned for the first LIST VERSIONS operation had no maximum number of results been enforced. In various embodiments, any number of such LIST VERSIONS operations may be invoked in order to list all of the data object versions in the target bucket.

In some embodiments, if the requester attempts to specify a version-id or user key for a LIST VERSIONS operation, the storage system may return an error indication (e.g., 405 Method Not Allowed, or similar). Note that the storage systems described herein may not support a distinct listing type operation that returns only the versions of a particular data object (i.e. all of the data object versions having a specified user key). However, in some embodiments, the parameters described herein for narrowing the list of responses to a LIST VERSIONS request may be used to limit responses in different ways. For example, the prefix parameter may be used to limit responses to data objects whose user keys begin with the specified prefix. If the prefix value specified in a LIST VERSIONS request corresponds to a user key value, and if there are no other user key values that being with that prefix value, the responses may be limited to the data object versions for a specific object.

The systems and methods described herein for supporting object versioning may allow efficient logical deletion of a stored object, using the delete marker described above. In some embodiments, a DELETE KEY operation may behave differently from the DELETE VERSION API described herein, in that a version-id is not specified for a DELETE KEY operation. For example, if the versioning state of the targeted bucket is enabled when a DELETE KEY operation is issued, this API may cause the storage system to create a new delete marker as the latest object version for the specified user key, and may assign a unique version-id to the delete marker. As noted above, the delete marker may not store any object data (i.e. the contents of the delete marker object may be empty), but the delete marker object may include metadata, such as that described herein. In this example, subsequent attempts to retrieve an object having the specified key without specifying a version-id (e.g. using GET OBJECT, GET ACL, or COPY) may return an error indication (e.g., 404 Object Not Found, or similar). Note, however, that in this case, the storage system may not have actually deleted any data objects, or the contents thereof, and the data object versions previously stored in the bucket may be addressable (and/or their contents accessible) using retrieval operations that specify their version-ids. Note that in some embodiments, the requester may need to have permission to modify the contents of the target bucket and/or permission to delete objects (or objects with the specified user key) in the target bucket in order to perform a DELETE KEY operation.

Figure 5:
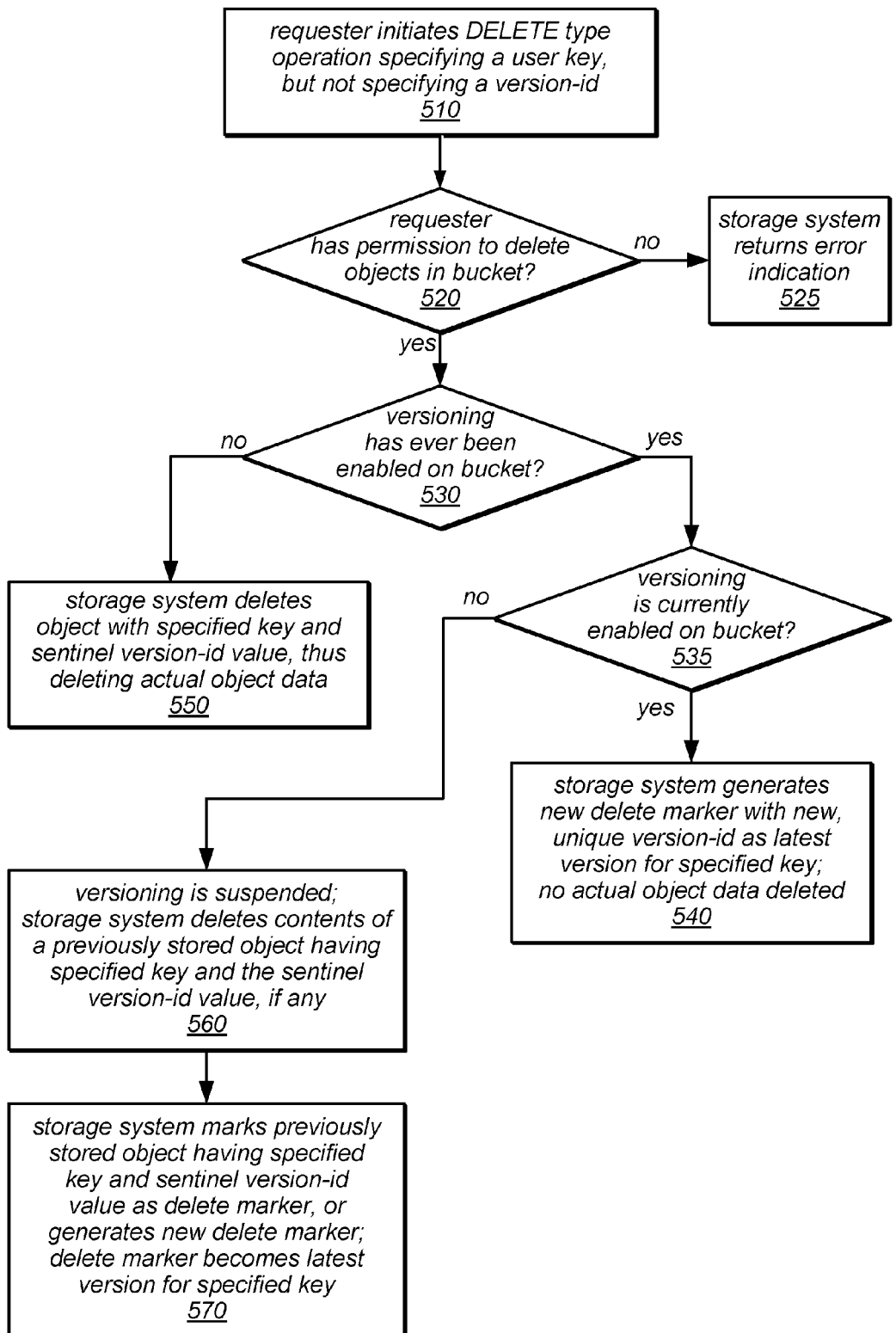
FIG. 5 is a flow diagram illustrating a method for deleting a user key in a storage system that supports versioning, according to one embodiment.

FIG. 5 is a flow diagram illustrating a method for deleting a user key in a storage system that supports versioning, according to one embodiment. As illustrated at 510, the method may include a requester (e.g. a user, user application, or process) initiating a delete type operation that specifies a user key, but that does not specify a version-id. For example, the requester may issue a DELETE KEY instruction to a shared storage system or storage service, and that DELETE KEY instruction may conform to an API similar to those described herein. The DELETE KEY instruction may be issued to request that a user key be deleted from a bucket that is owned by the requester (e.g., a bucket owned by a user who is a storage service subscriber), and/or that is currently being accessed. As described in more detail below, in response to receiving the request (i.e. via the DELETE KEY instruction), the storage system may logically delete the specified key from the bucket, and may or may not actually delete a data object or its contents from the target bucket.

As illustrated at 520, the method may include the storage system determining whether the requester has permission to delete objects that are stored in the target bucket. If not, shown as the negative exit from 520, the method may include the storage system returning an indication of an error to the requester, as in 525. If the requester has permission to delete objects that are stored in the target bucket, shown as the positive exit from 520, and if versioning has never been enabled on the bucket (e.g., if the current versioning state is "off" and is has never been "enabled"), shown as the negative exit from 530, the method may include the storage system deleting a version of a stored data object having the user key specified in the request and the sentinel version-id value, if such a version exists. In this case, actual object data (including the content stored in the data object) may be deleted, as in 550. As illustrated in this example, if the bucket's versioning state is currently "enabled", shown as the positive exit from 530 and the positive exit from 535, the method may include the storage system generating a new delete marker (with a new, unique version-id) as the latest version for the specified key, as in 540. As illustrated in this example, in this case, no actual object data is deleted. On the other hand, if the versioning state of the bucket is "suspended", shown as the positive exit from 530 and the negative exit from 535, the method may include the storage system deleting the contents of a previously stored object having the specified key and the sentinel version-id value (if any exists), as in 560. The method may also include the storage system marking a previously stored object having the specified key and the sentinel version-id value (if any exists) as a delete marker, or (if none exists) generating a new delete marker (with the sentinel version-id value), as in 570. The delete marker may then become the latest version for the specified key. In some embodiments, marking a previously stored object as a delete marker may involve modifying metadata associated with and/or stored in the object to designate the object as a delete marker.

Note that in some embodiments, more than one delete marker object may be stored in the bucket for a given key. For example, if a delete operation is requested for a given key after a delete marker has already been created for that key, another delete marker (with another unique version-id) may be created for that key. In such embodiments, two or more delete markers may be created back-to-back (i.e. as adjacent object versions in the sequential ordering of objects with the given key), or delete markers may be stored in the bucket in multiple arbitrary positions within the sequential ordering of objects with the given key. For example, if two delete operations specifying the same key are performed (and versioning is enabled) without performing any store operations specifying that key between them, two back-to-back delete markers may be created in the bucket. If one or more store operations for a given key are performed between two delete operations specifying that key (and versioning is enabled), the delete markers and newly stored object versions may be interspersed within the sequential ordering of objects with that key.

As previously noted, a different operation, e.g., a DELETE VERSION operation defined by the API, may in some embodiments be used to permanently delete a version of a stored data object. In such embodiments, this API may provide the only way to permanently delete object versions that are protected by versioning, while objects having a sentinel version-id value may be overwritten and/or deleted in other ways. Since this API facilitates the irreversible, permanent deletion of data, it may be a privileged operation that can only be performed by the owner of the bucket containing the data object version targeted for deletion and/or by another privileged user to whom permission to permanently delete a version of a stored data object has been granted. In some embodiments, as long as a user/subscriber is not acting as the bucket owner or as a privileged user, the user/subscriber cannot irreversibly delete the data stored in a bucket. Note that this DELETE VERSION operation is different from the DELETE KEY operation described above in that a version-id must be specified for the DELETE VERSION operation. As noted above, in some embodiments, the requester may need to have permission to modify the contents of the target bucket, to have permission to delete the specified object version, and/or to be acting as the bucket owner or as a privileged user in order to perform a DELETE VERSION operation.

Figure 6:
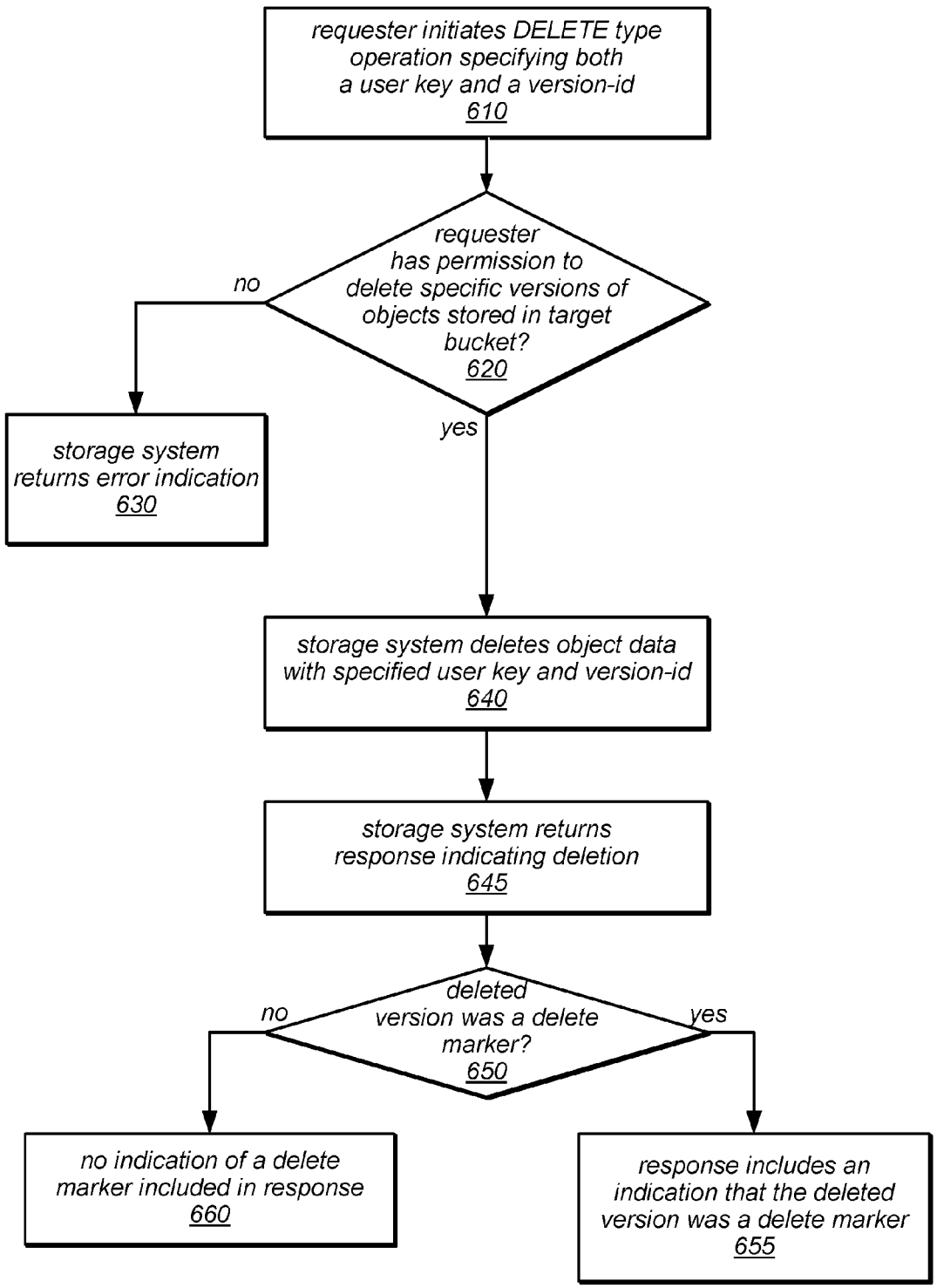
FIG. 6 is a flow diagram illustrating a method for deleting a specific version of a data object that is stored in a storage system that supports versioning, according to one embodiment.

FIG. 6 is a flow diagram illustrating a method for deleting a specific version of a data object stored in a storage system that supports versioning, according to one embodiment. As illustrated at 610, the method may include a requester (e.g. a user, user application, or process) initiating a delete type operation that specifies a user key and a version-id. For example, the requester may issue a DELETE VERSION instruction to a shared storage system or storage service, and that DELETE VERSION instruction may conform to an API similar to those described herein. The DELETE VERSION instruction may be issued to request that a specified version of a data object be deleted from a bucket that is owned by the requester (e.g., a bucket owned by a user who is a storage service subscriber), and/or that is currently being accessed. As described in more detail below, in response to receiving the request (i.e. via the DELETE VERSION instruction), the storage system may logically delete the specified key from the bucket, but may or may not actually delete any object data (e.g., the content of any stored data objects) from the target bucket.

As illustrated at 620, the method may include the storage system determining whether the requester has permission to delete specific versions of objects stored in the target bucket. If not, shown as the negative exit from 620, the method may include the storage system returning an indication of an error to the requester, as in 630. If the requester has permission to delete specific versions of objects stored in the target bucket, shown as the positive exit from 620, the method may include the storage system deleting the object data with the specified key and version-id, as in 640. As illustrated in this example, in this case, actual object data is deleted.

As illustrated in this example, the method may include the storage system returning a response (e.g., to the requester) indicating that the data object has been deleted, as in 645. If the deleted version was a delete marker, shown as the positive exit from 650, the response may include an indication that the deleted version was a delete marker, as in 655. If the deleted version was not a delete maker, no such indication is included in the response, as shown in 660. Note that in some embodiments, this API may behave the same regardless of whether the current versioning state of the targeted bucket is "enabled", "off" or "suspended". Note also, that in some embodiments, a bucket cannot be deleted unless all of the object versions stored in the bucket have been permanently deleted using the DELETE VERSION API.

As described herein, the versioning state of a bucket may have different implications for each API performed on that bucket and/or for objects stored within that bucket. In some embodiments, the versioning state of a bucket can be in one of three possible states: off, enabled, and suspended. As previously noted, in some embodiments, the versioning state of newly created buckets may be the off state, by default. In some embodiments, once the bucket versioning state is either enabled or suspended, the versioning state may never be reverted to the off state. In some embodiments, the storage systems described herein may provide APIs to set and/or retrieve the value of a bucket's versioning state. In such embodiments, a requester may need have to have a special type of permission to retrieve the versioning state of a bucket, and may need to have the same or a different type of permission on the bucket (and/or be acting as the bucket owner) in order to set or change its versioning state.

Figure 7:
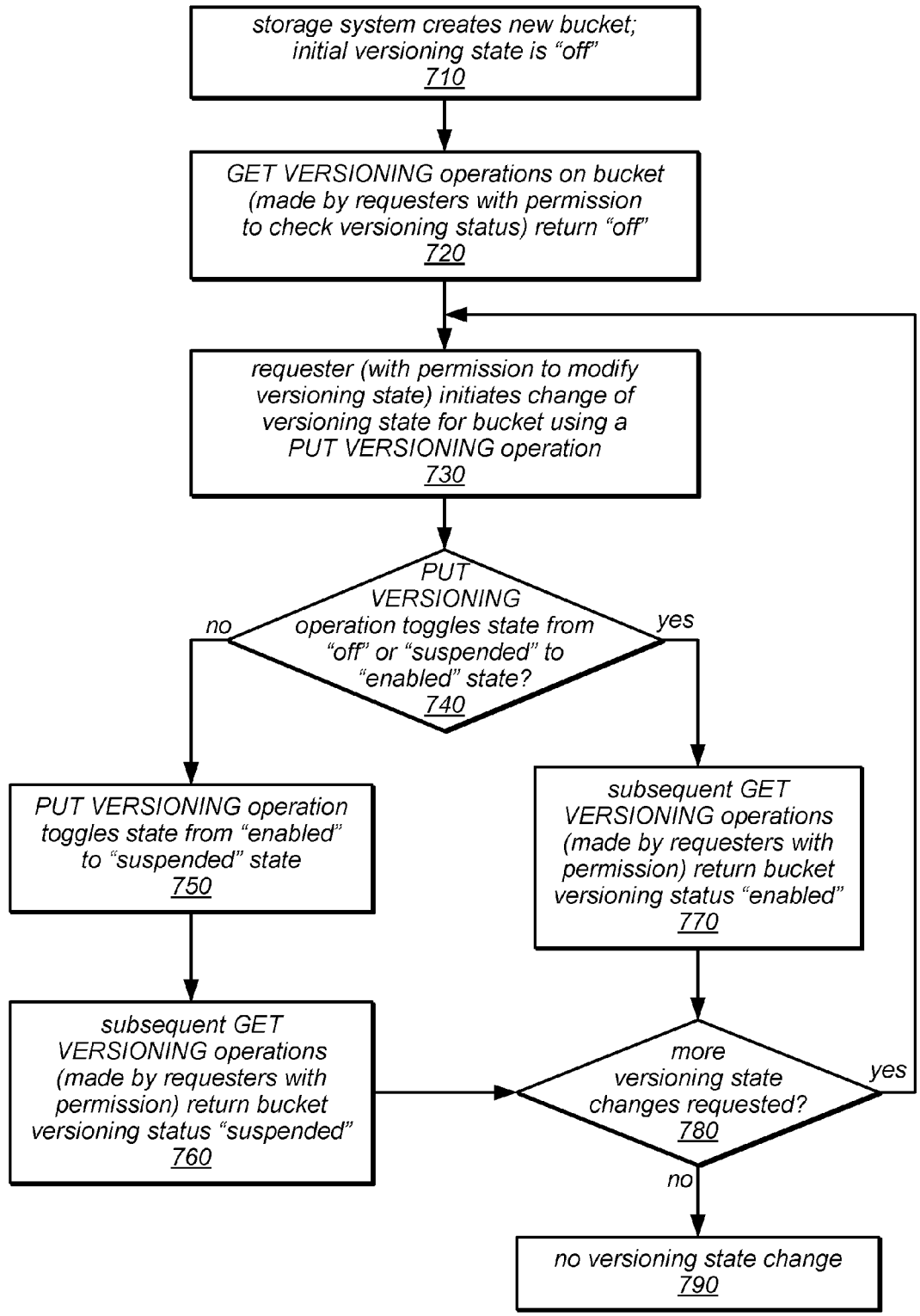
FIG. 7 is a flow diagram illustrating a method for changing the versioning state of a bucket in a storage system that supports versioning, according to one embodiment.

FIG. 7 is a flow diagram illustrating a method for changing the versioning state of a bucket in a storage system that supports versioning, and some of the effects of such a change, according to one embodiment. As illustrated at 710 in FIG. 7, the method may include the storage system creating a new bucket, for which the initial versioning state may be "off". As noted above, in some embodiments, the default versioning state for newly created buckets may be "off" while in other embodiments, the default versioning state may be "enabled", or a user may be able to specify the versioning state for newly created buckets. In this example, while versioning is turned off, a GET type operation on the versioning status of the bucket (e.g., using a GET VERSIONING instruction) may return a value indicating that the versioning state is "off", as in 720.

As illustrated at 730, a requester (e.g. a user, user application, or process) may initiate a change of the versioning state using a PUT type operation. For example, the requester may issue a PUT VERSIONING instruction to a shared storage system or storage service, and that PUT VERSIONING instruction may conform to an API similar to those described herein. In some embodiments, the PUT VERSIONING instruction, which may be used to specify a new versioning state for a bucket, may only be issued by a requester that has permission to modify the versioning state of the bucket (e.g., the bucket owner and/or another privileged user who has permission to modify the versioning state of the bucket). If the PUT VERSIONING operation specifies that the versioning state for the bucket should be toggled from "off" or "suspended" to "enabled", shown as the positive exit from 740, the method may include the storage system changing the versioning state of the bucket to "enabled". For example, in embodiments in which the default versioning state for a newly created bucket is the "off" state, the PUT VERSIONING operation may be used to change the versioning state to "enabled". In other words, during a first invocation of the method illustrated in FIG. 7, the positive exit may be taken from element 740. On one or more subsequent invocations of the method illustrated in FIG. 7, the versioning state may be toggled from "enabled" to "suspended" or (subsequently) from "suspended" to "enabled" by alternating between the positive and negative exits from element 740 on alternate invocations. Once the versioning state of the bucket has been changed to "enabled", any subsequent GET VERSIONING operations on the bucket versioning status may return a value indicating that the versioning state is "enabled", as in 770, until or unless another change in the versioning state is requested. As illustrated in FIG. 7, in some embodiments a requester may only be able to view the versioning state of a bucket if the requester has permission to view the versioning state of the bucket.

As illustrated in FIG. 7, if any additional versioning state changes are requested, shown as the positive exit from 780, the method may include repeating the operations illustrated in 730-780 for the requested changes. Otherwise, shown as the negative exit from 780, the versioning state may not change, as in 790. If the PUT VERSIONING operation does not specify that the versioning state of the bucket should be toggled from "off" to "enabled" shown as the negative exit from 740, the PUT VERSIONING operation may specify that the versioning state of the bucket should be toggled from "enabled" to "suspended", as in 750. In the example described above, on the second invocation (and subsequent alternating invocations) of the method illustrated in FIG. 7, the negative exit from 740 may be taken. In other words, the PUT VERSIONING operations of these invocations may be used to toggle the versioning state of the bucket from "enabled" to "suspended". If the PUT VERSIONING operation specifies that the versioning state of the bucket should be toggled from "enabled" to "suspended", the method may include the storage system changing the versioning state of the bucket to "suspended". Once the versioning state of the bucket has been changed to "suspended", any subsequent GET VERSIONING operations on the bucket versioning status may return a value indicating that the versioning state is "suspended", as in 760, until or unless another change in the versioning state is requested. As illustrated in FIG. 7, in some embodiments a requester may only be able to view the versioning state of a bucket if the requester has permission to view the versioning state of the bucket.

Again, if any additional versioning state changes are requested, shown as the positive exit from 780, the method may include repeating the operations illustrated in 730-780 for the requested changes. Otherwise, shown as the negative exit from 780, the versioning state may not change, as in 790. As illustrated in this example, in some embodiments, the versioning state of a bucket cannot be changed to the "off" state from either the "enabled" or the "suspended" state.

As previously noted, in some embodiments enabling and/or suspending versioning may be performed at the bucket level. In other embodiments, the versioning feature may be enabled and/or suspended for all of the buckets in a storage system (e.g., by a privileged user), or on an owner, content type, or other basis. Note again that enabling versioning on a bucket may not change anything about the objects already stored in the bucket, including their version-ids (whose values may all be the sentinel value), their contents, and their permissions, but after versioning has been enabled for the bucket, all objects added to it may be assigned a unique version-id. In some embodiments, these unique version-ids may be randomly generated. In some embodiments, they may be Unicode, UTF-8 encoded, URL-ready, opaque strings of no more than a pre-defined length. For example, in some embodiments version-ids may be at most 1024 bytes long, although much shorter version-ids are used in the examples described herein. Note that in some embodiments, version-ids may only be assigned by the storage system itself, and they may not be editable. In some embodiments, the GET VERSIONING API may behave the same whether the current versioning state of the targeted bucket is "enabled", "off", or "suspended", i.e. it may always return the versioning state, regardless of its value. By contrast, in some embodiments, the PUT VERSIONING API may behave differently depending on whether the current versioning state of the targeted bucket is "enabled", "off", or "suspended". For example, in some embodiments the versioning state of a bucket may be changed from "off" to "enabled", from "enabled" to "suspended", or from "suspended" to "enabled", but it may not be changed from "enabled" or "suspended" to "off". In such embodiments, in response to an invalid change in the versioning state, the system may return an error indication. In various embodiments, the versioning state of a bucket may be changed in constant time (i.e. independent of the number of objects stored in the bucket or whether any or all of them include unique version-ids).

In some embodiments, every stored object version may have its own access control list (ACL). For example, in some embodiments, a user may specify an ACL for an object when writing the object to the storage system, and/or may modify the ACL for the object at a later time. In such embodiments, the system may provide APIs by which a user can GET and/or PUT an ACL for a specific object version by specifying a key and a version-id in a request to do so. In some embodiments, if a version-id is not specified in a GET ACL request, the storage system may retrieve the ACL for the latest version of the data object having the key specified in the request. Similarly, if a version-id is not specified in a PUT ACL request, the storage system may set the ACL for the latest version of the data object having the key specified in the request. In some embodiments, the GET ACL and PUT ACL APIs may behave the same irrespective of the current versioning state of the targeted bucket. In some embodiments, a requester may need to have permission to view or retrieve an object (e.g., according to the applicable access control policy, or ACP) to perform a GET ACL operation on the object, and may need to have permission to modify an object (according to the ACP) to perform a PUT ACL operation on the object, as described below. Various authentication mechanisms may be used to ensure that data is kept secure from unauthorized access, according to some embodiments.

Figure 8:
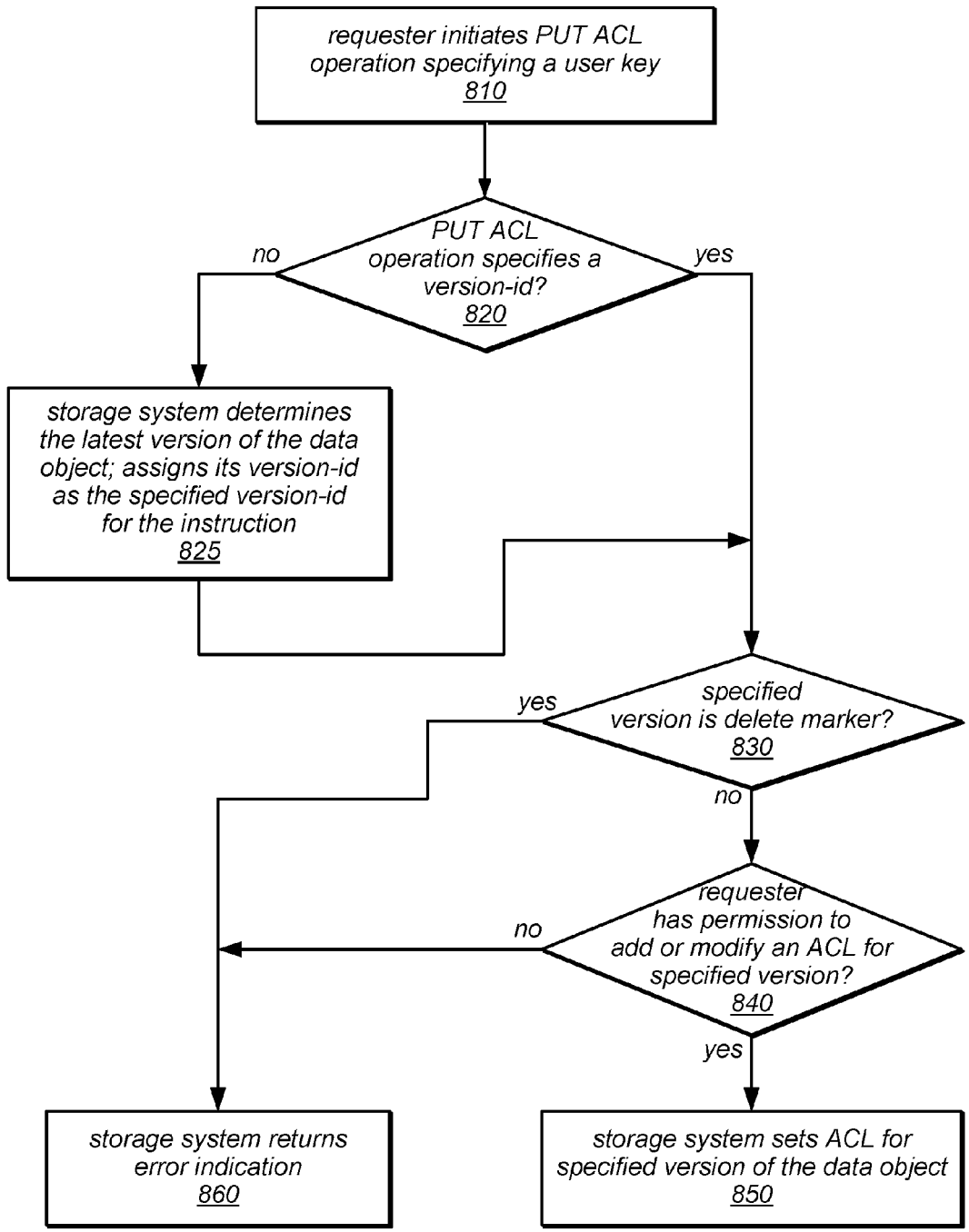
FIG. 8 is a flow diagram illustrating a method for adding an access control list (ACL) to a data object in a storage system that supports versioning, according to one embodiment.

FIG. 8 is a flow diagram illustrating a method for adding (or modifying) an access control list (ACL) to an object in a storage system that supports versioning, according to one embodiment. As illustrated at 810, the method may include a requester (e.g. a user, user application, or process) initiating a PUT ACL operation that specifies a user key. For example, the requester may issue a PUT ACL instruction to a shared storage system or storage service, and that PUT ACL instruction may conform to an API similar to those described herein. The PUT ACL instruction may be issued to request that an access control list be added to a stored object having the specified user key.

As illustrated in this example, if the PUT ACL instruction does not specify a version-id, shown as the negative exit from 820, the method may include the storage system determining the latest version of the data object (e.g., using a FIND NEAREST operation), as in 825, and assigning its version-id as the specified version-id for the PUT ACL instruction. Again note that in some cases the data object version that is determined to be the latest version by the operation illustrated at 825 may not be latest version of the object by the time one or more of the subsequent operations illustrated in FIG. 8 are performed. However, the data object version that was determined to be the latest version at 825 may be the target of the PUT ACL operation for the remainder of the PUT ACL process illustrated in FIG. 8. As illustrated in FIG. 8, the method may include determining whether the specified version is a delete marker, as in 830. If so, shown as the positive exit from 830, the storage system may return an error indication to the requester, as in 860. If the specified version is not a delete marker, shown as the negative exit from 830, the method may include the storage system determining whether the requester has permission to add or modify an access control policy for the specified version of the object (e.g., permission to add a new access control policy or overwrite an existing access control policy for the specified version), as in 840. If the requester has permission to add or modify an access control list for the specified version of the object, shown as the positive exit from 840, the method may include the storage system setting (or overwriting) the ACL for the specified version of the data object, as in 850. If the requester does not have permission to add or modify an access control list for the specified version of the object, shown as the negative exit from 840, the method may include the storage system returning an error indication, as in 860. Note that in some embodiments, the PUT ACL API may behave the same regardless of whether the current versioning state of the targeted bucket is "enabled", "off", or "suspended".

Figure 9:
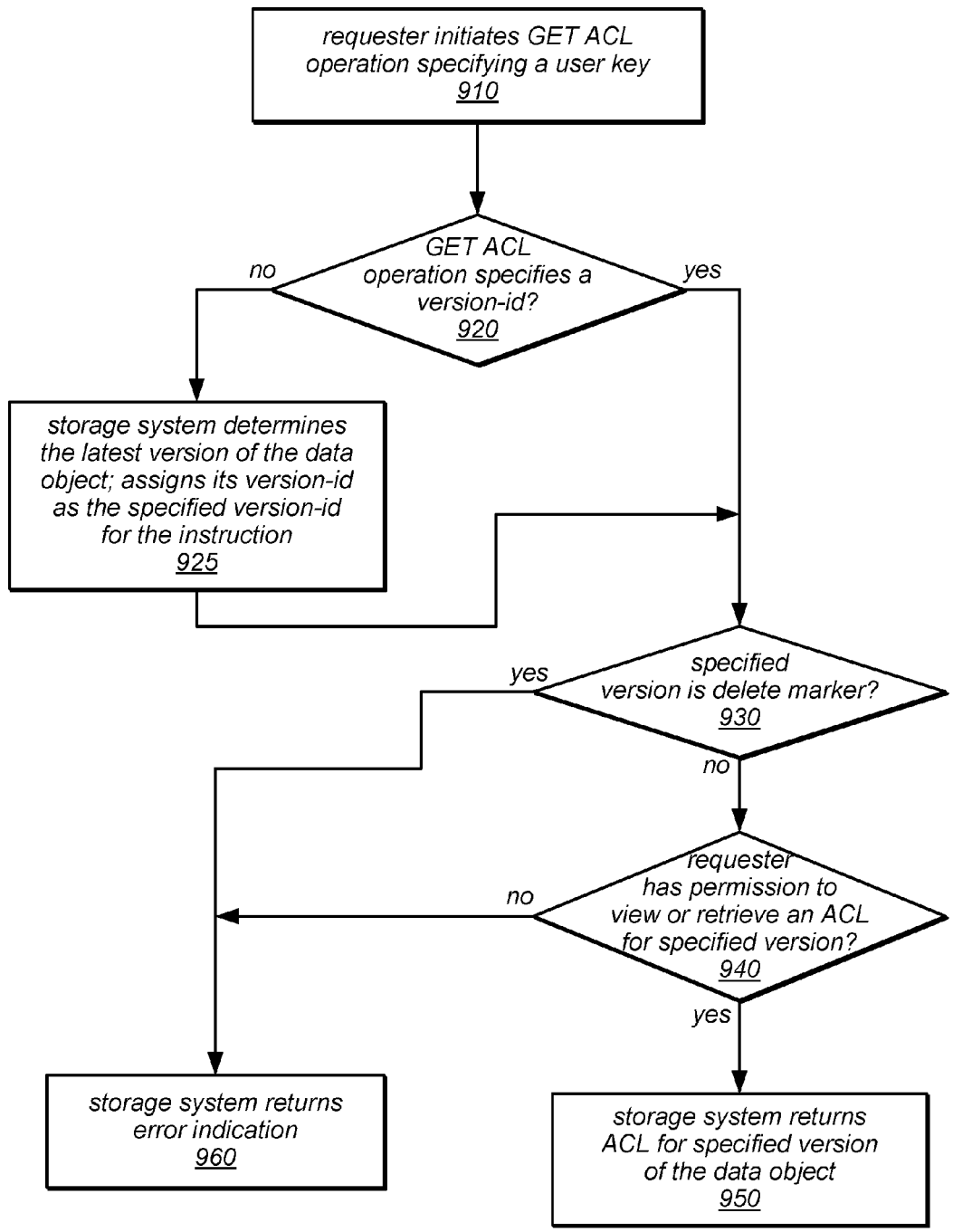
FIG. 9 is a flow diagram illustrating a method for retrieving an access control list (ACL) of a data object from a storage system that supports versioning, according to one embodiment.

FIG. 9 is a flow diagram illustrating a method for retrieving an access control list (ACL) of an object from a storage system that supports versioning, according to one embodiment. As illustrated at 910, the method may include a requester (e.g. a user, user application, or process) initiating a GET ACL operation that specifies a user key. For example, the requester may issue a GET ACL instruction to a shared storage system or storage service, and that GET ACL instruction may conform to an API similar to those described herein. The GET ACL instruction may be issued to request an access control list for a stored object having the specified user key.

As illustrated in this example, if the GET ACL operation does not specify a version-id, shown as the negative exit from 920, the method may include the storage system determining the latest version of the data object (e.g., using a FIND NEAREST operation), as in 925, and assigning its version-id as the specified version-id for the instruction. Again note that in some cases the data object version that is determined to be the latest version by the operation illustrated at 925 may not be latest version of the object by the time one or more of the subsequent operations illustrated in FIG. 9 are performed. However, the data object version that was determined to be the latest version at 925 may be the target of the GET ACL operation for the remainder of the GET ACL process illustrated in FIG. 9. As illustrated in this example, the method may include the storage system determining whether the specified version of the object is a delete marker, as in 930. If the specified version of the object is a delete marker, shown as the positive exit from 930, the method may include the storage system returning an error indication, as in 960. If the specified version of the object is not a delete marker, shown as the negative exit from 930, the method may include the storage system determining whether the requester has permission to view and/or retrieve an access control list for the specified version of the object, as in 940. If the requester has permission to view and/or retrieve an access control list for the specified version of the object, shown as the positive exit from 940, the method may include the storage system returning the ACL for the specified version of the data object, as in 950. If the requester does not have permission to view and/or retrieve an access control list for the specified version of the object, shown as the negative exit from 940, the method may include the storage system returning an error indication, as in 960. In some embodiments, the GET ACL operation may behave the same regardless of whether the current versioning state of the targeted bucket is "enabled", "off", or "suspended".

Note that in various embodiments, different ones of the conditions that lead to the return of an error indication, such as those illustrated in FIGS. 1-9 and described above, may cause different error indications to be returned. In other words, for each of the different conditions that may lead to the return of an error condition, the response may include a different error code and/or text string indicative of the particular condition that caused the error indication. In some embodiments, such an indication may be included in the header of a response returned by the storage system, i.e. in response to an operation request issued by a user, user application, or process.

Figures 10F, 10G:
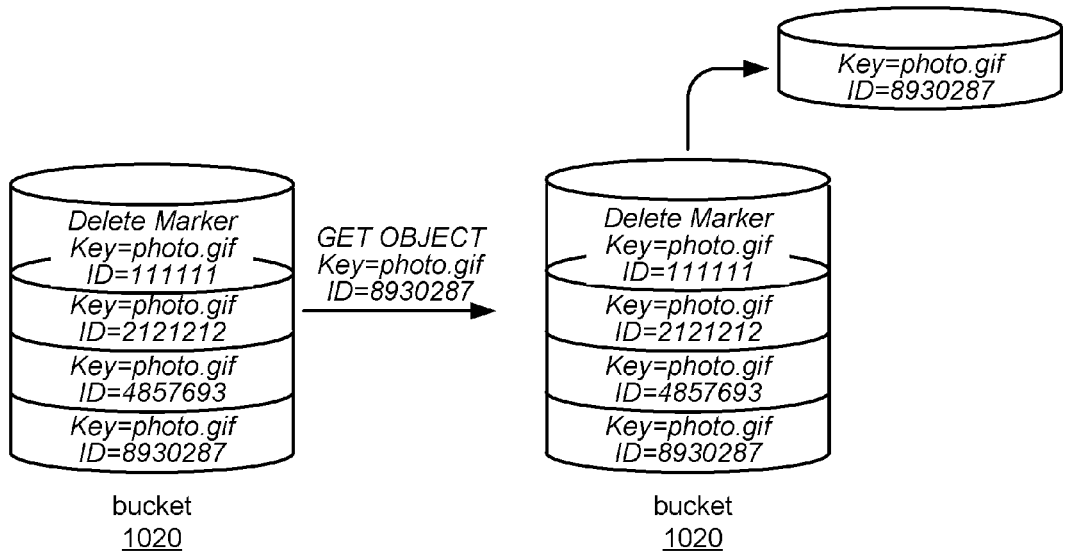

FIGS. 10A-10I illustrate the effects of various operations on a bucket in a storage system that supports versioning, according to one embodiment. As previously noted, in some embodiments, when an object is stored in a versioning-enabled bucket, the old version may not be overwritten. This is illustrated in FIGS. 10A and 10B. For example, FIG. 10A illustrates a PUT OBJECT operation in which a new version of an object having the key "photo.gif" is stored in a versioning-enabled bucket 1020 that already contains two objects with the same name (i.e. with the same user key). In this example, the original object (i.e. the object having the version-id value shown as ID=8930287) and another version of the object (i.e. the object having the version-id value shown as ID=4857693) remain in bucket 1020 following the PUT OBJECT operation. In response to the PUT OBJECT operation (which does not specify a version-id), the system generates a new version identifier (shown as ID=2121212), and adds the newer version of the object "photo.gif" (illustrated in FIG. 10A as object 1010) to bucket 1020. The result of this PUT OBJECT operation is illustrated in FIG. 10B, which depicts bucket 1020 storing all three of these versions of the object "photo.gif". Note that the functionality described herein for generating new version identifiers for objects when they are stored in the system may prevent users from accidentally overwriting or deleting objects, and may also provide users the opportunity to retrieve a previous version of an object.

As previously noted, in some embodiments, when a user key is deleted from a versioning-enabled bucket (i.e. using a DELETE KEY operation), all versions of the object may remain in the bucket, and a delete marker object may be inserted in the bucket. This is illustrated in FIGS. 10C-10D. For example, FIG. 10C illustrates a DELETE KEY operation targeting an object stored in versioning-enabled bucket 1020 that has a user key "photo.gif". In this example, since the DELETE KEY operation does not specify a version-id for the object to be deleted, no objects are actually deleted from bucket 1020. Instead, in response to the DELETE KEY operation, the system generates a new version-d value (shown as ID=111111), and inserts a new delete marker object with that version-id in bucket 1020. The result of this DELETE KEY operation is illustrated in FIG. 10D, which depicts bucket 1020 storing all three of the previous versions of the object "photo.gif" and the newly added delete marker for the "photo.gif" user key. As illustrated in this example, the delete marker itself becomes the latest version of the data object.

As previously noted, in some embodiments, by default, a GET OBJECT operation may retrieve and return the latest version (i.e. the most recently stored version) of an object having a specified user key. In such embodiments, in response to a GET OBJECT operation specifying a user key but not a version-id, the storage system may return an error indication if the latest version of the object is a delete marker. This is illustrated in FIG. 10E. In this example, a GET OBJECT operation targeting versioning-enabled bucket 1020 and specifying a user key "photo.gif" returns a "404 No Object Found" error indication, since the latest version of an object having the key "photo.gif" is a delete marker. In this example, there is no change in the contents of bucket 1020 as a result of this GET OBJECT operation.

In some embodiments, however, even if the latest version of an object is a delete marker object, an older version of that object may be retrieved using a GET OBJECT operation that specifies the version-id of the older version. This is illustrated in FIGS. 10F and 10G. In this example, FIG. 10F illustrates a GET OBJECT operation targeting versioning-enabled bucket 1020 that specifies user key "photo.gif" and version-id 8930287. In this example, even though there is a delete marker associated with user key "photo.gif" the specified version of the object may be retrieve and returned by the storage system. The result of this GET OBJECT operation is illustrated in FIG. 10G, which depicts that the data object having key "photo.gif" and version-id 8930287 is returned to the requester. This example illustrates that in response to a GET OBJECT operation that specifies an object version, the storage system may return that object version even if it is not the latest version of that object, and even if the latest version of that object (or any more recent version of that object) is a delete marker object. Note that, as in the previous example, there is no change in the contents of bucket 1020 as a result of this GET OBJECT operation.

Figures 10H, 10I:
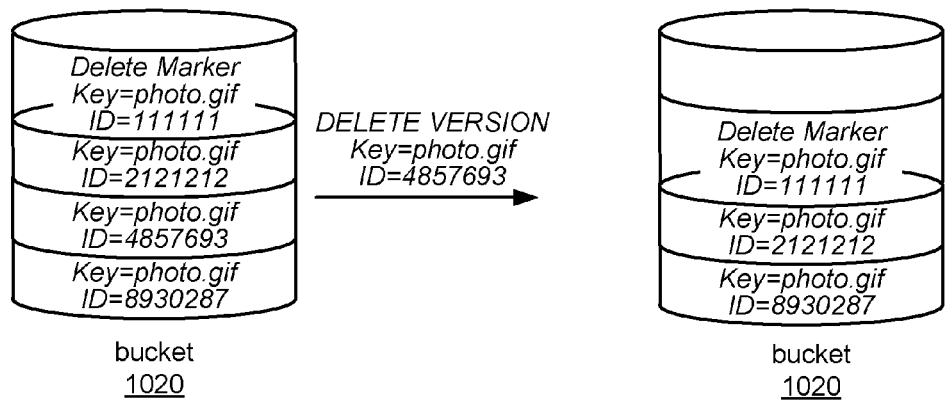

As previously noted, in some embodiments, a stored data object may be permanently deleted using a delete type operation that specifies the particular version to be deleted. In some such embodiments, only a user with special privileges (e.g., the owner of the bucket, or another user to whom permission to permanently delete objects in the bucket has been granted) may be able to permanently delete a version of an object stored in the bucket. This is illustrated in FIGS. 10H-10I. In this example, FIG. 10H illustrates a DELETE VERSION operation targeting versioning-enabled bucket 1020 that specifies both the user key "photo.gif" and the version-id 4857693. As illustrated in this example, in response to this DELETE VERSION operation, the storage system may permanently deletes the specified version of the object from bucket 1020 without inserting a delete marker object. The result of this DELETE VERSION operation is illustrated in FIG. 10I, which that the data object having key "photo.gif" and version-id 4857693 has been removed from bucket 1020, and that no additional delete marker object has been added. As illustrated in this example, any other versions of this object may remain stored in bucket 1020 following this DELETE VERSION operation.

Figure 11G:
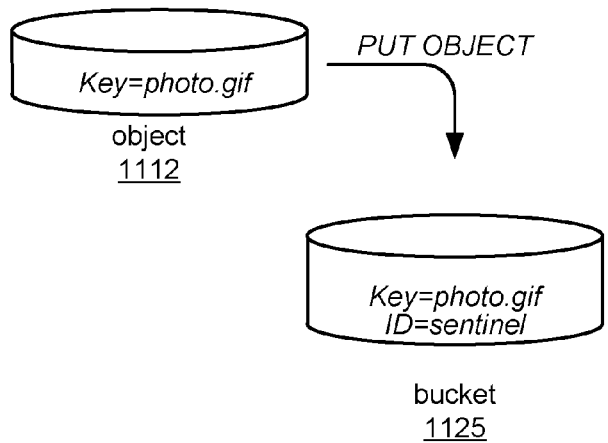

As described herein, some of the operations targeting a bucket, or objects therein, may behave differently depending on whether a versioning feature supported in the system is off, enabled, or suspended. FIGS. 11A-11M illustrate the effects of various operations on a bucket when such a versioning feature is off, enabled, or suspended, according to one embodiment. For example, FIG. 11A illustrates a PUT OBJECT operation in which an object 1110 having the user key "photo.gif" is stored in a bucket 1120 that does not contain any other objects with the same name (i.e. with the same user key), and for which a versioning feature is off (and has never been on). Note that in this example, bucket 1120 may contain objects having other user keys (not shown). In this example, as a result of the PUT OBJECT operation, an object having the specified user key ("photo.gif") and a version-id with a special sentinel value is stored in bucket 1120, as shown in FIG. 11B. FIG. 11C illustrates a second PUT OBJECT operation in which an object 1111, which specifies the same user key as object 1110 ("photo.gif"), is stored in bucket 1120. In this example, since the versioning feature is off, this second PUT OBJECT operation causes the data of object 1110 that was stored in bucket 1120 to be overwritten by the data of object 1111. This is illustrated in FIG. 11D, which illustrates a single object having the specified user key ("photo.gif") and a version-id with the special sentinel value.

As described above, when a versioning feature supported by a storage system is off, a delete type operation may actually delete data from a bucket in the storage system. FIG. 11E illustrates a DELETE KEY operation on bucket 1120 while the versioning feature is still off. In this example, the DELETE KEY operation specifies a user key ("photo.gif") but does not specify a version-id. In response to this DELETE KEY operation, the object stored in bucket 1120 that has the specified user key ("photo.gif") and a version-id having the special sentinel value is deleted. The result of this operation is illustrated in FIG. 11F, which illustrates that bucket 1120 no longer contains any objects having the user key "photo.gif".

Figure 11H:
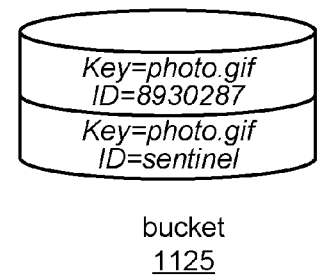

As described herein, if a versioning feature is initially off for a particular bucket, but is later enabled, various operations targeting that bucket may behave differently than they did before the versioning feature was enabled. In the example illustrated in FIG. 11G, it is assumed that the versioning feature for bucket 1125 was off when one or more PUT OBJECT operations for objects having a user key "photo.gif" were performed. This resulted in a data object being stored in bucket 1125 having the user key "photo.gif" and a version-id with a special sentinel value, and this object may have been overwritten by subsequent PUT OBJECT operations that also specified the user key "photo.gif" while the versioning feature was off. FIG. 11G illustrates an operation to store an object 1112 that has the user key "photo.gif", and that is performed on bucket 1125 after the versioning feature has been enabled for bucket 1125. As a result of this PUT OBJECT operation, a new object version is created and stored in bucket 1125, as illustrated in FIG. 11H. This new object version has the user key "photo.gif", and a new, unique version-id value (8930287) that was created by the system in response to the PUT OBJECT operation. Note that a subsequent GET OBJECT operation targeting bucket 1125 and specifying user key "photo.gif" (but not specifying a version-id) would return the data of object 1112, since this is the object having the specified user key that was most recently stored in bucket 1125.

Figure 11I:
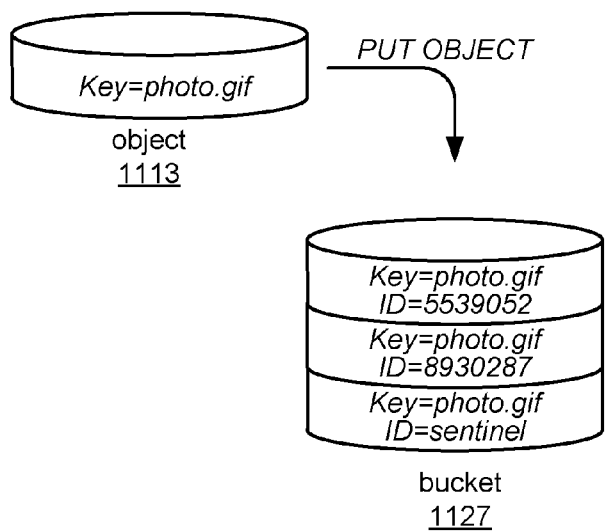

As described herein, if a versioning feature has been enabled for a particular bucket, but is later suspended, various operations targeting that bucket may behave differently than they did when the versioning feature was off or enabled. In the example illustrated in FIG. 11I, it is assumed that one or more PUT OBJECT operations targeting bucket 1127 and specifying the user key "photo.gif" were performed while the versioning feature was off (resulting in the storing and/or overwriting of an object version with a version-id having a special sentinel value), and two PUT OBJECT operations targeting bucket 1127 and specifying the user key "photo.gif" were performed after the versioning feature was subsequently enabled (one of which created and stored a new object version with version-id 8930287, and one of which created and stored a new object version with version-id 5539052). FIG. 11I illustrates an operation to store an object 1113 that has the user key "photo.gif", and that is performed on bucket 1127 after the versioning feature has been suspended for bucket 1127. As a result of this PUT OBJECT operation, no new object versions are created or stored in bucket 1127, but the object version previously stored in bucket 1127 and having the user key "photo.gif" and a version-id with the special sentinel value may be overwritten with the data of object 1113. Note that in this example, a subsequent GET OBJECT operation targeting bucket 1127 and specifying user key "photo.gif" (but not specifying a version-id) would return the data of object 1113, since this is the object having the specified user key that was most recently stored in bucket 1127.

Figure 11J:
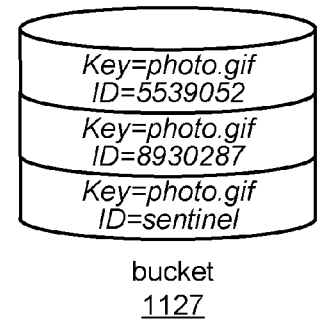
Figure 11K:
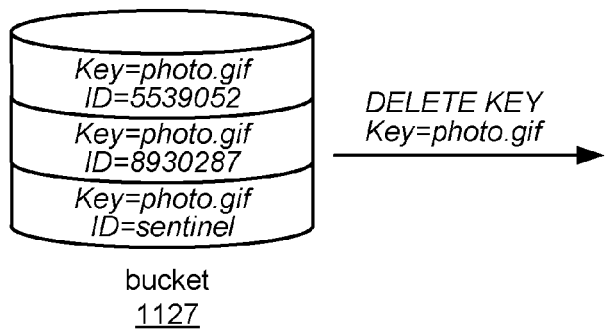
Figure 11L:
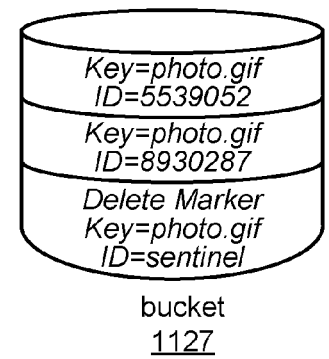

FIG. 11K illustrates a DELETE KEY operation targeting bucket 1127 following the operations illustrated in FIGS. 11I and 11J, and while the versioning feature is still suspended for bucket 1127. In this example, the DELETE KEY operation specifies the user key "photo.gif", but does not specify a version-id. In response to this DELETE KEY operation, the system deletes the data of an object previously stored in bucket 1127 that has the user key "photo.gif" and a version-id with the special sentinel value. The system then marks this object as a delete marker object in bucket 1127. The result of this DELETE KEY operation is illustrated in FIG. 11L, which depicts bucket 1127 storing two of the previously stored versions of the object "photo.gif" (those stored while versioning was enabled) and the newly marked delete marker for the "photo.gif" user key. In this example, the delete marker becomes the latest version of the data object.

Figure 11M:
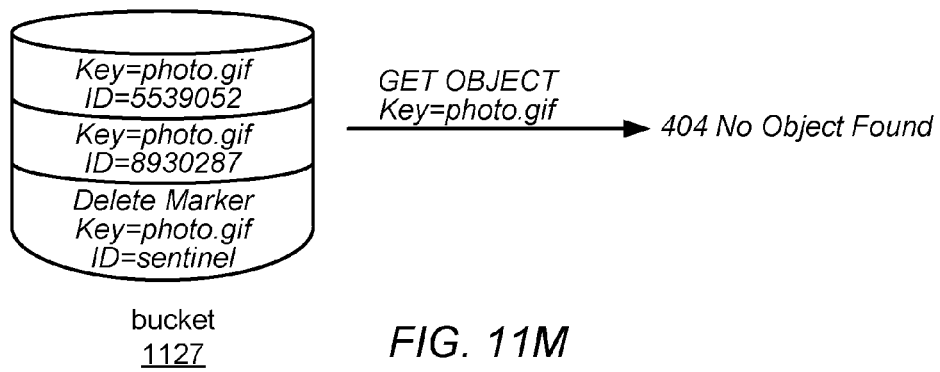

As previously noted, in some embodiments, by default, a GET OBJECT operation may retrieve and return the latest version of an object having a specified user key (i.e. the version with the most recently stored data). In such embodiments, in response to a GET OBJECT operation specifying a user key but not a version-id, the storage system may return an error indication if the latest version of the object is a delete marker. In some embodiments, the behavior of the GET OBJECT operation may be the same regardless of the versioning state of the bucket targeted by the GET OBJECT operation. This is illustrated in FIG. 11M. In this example, a GET OBJECT operation performed following the operations illustrated in FIGS. 11K-11L, which targets bucket 1127 and specifies a user key "photo.gif" but not a version-id returns a "404 No Object Found" error indication, since the latest version of an object having the key "photo.gif" is the recently marked delete marker. In this example, there is no change in the contents of bucket 1127 as a result of this GET OBJECT operation.

FIGS. 12A-12C illustrate examples of the ordering of the elements (e.g., inodes) in a key map, according to one embodiment. In these examples, key map 1200 reflects the contents of a bucket that includes objects having user keys of A, B, and C. FIG. 12A illustrates the contents of key map 1200 after three explicit versions of each of these objects have been stored in the bucket (while versioning was enabled for the bucket). In this example, the version-id values for these objects (each of which may comprise a sequencer value and a unique identifier, in some embodiments) have been simplified for illustration purposes, and are shown as version-id values of 2, 3, and 4.

As described herein, in some embodiments, the elements in a key map for a given bucket may be sorted first by user key (lexicographically), and then by their version-id values. In embodiments in which the version-id values for each explicitly created object version includes a sequencer portion based on the creation date of the object, sorting key map elements for explicit object versions by their version-id values effectively places them in order of the creation dates of those objects (i.e. in reverse chronological order, such that the elements associated with the most recently stored object versions appear first in the key map). This sorting scheme is illustrated in FIG. 12A, in which the three versions of an object having user key A are sorted in reverse order by version-id, and are followed by the three versions of an object having user key B (again sorted in reverse order by version-id), and finally the three versions of an object having user key C (sorted in reverse order by version-id).

As described herein, a FIND NEAREST operation may in some embodiments be invoked by the storage system to determine the latest version of an object with a given key, when no version-id is specified for an operation specifying the given key. In some embodiments, this FIND NEAREST operation may search the key map for the target bucket to locate the first key map element (e.g., inode) having the specified user key. If all of the elements in the key map having the specified key are associated with explicit object versions, the first element in the key map having the specified key may represent the latest object version with the specified key. Thus, in the example illustrated in FIG. 12A, a GET OBJECT operation on user key A would return the data of the object represented by the first element of the key map (A#2), which is an object having user key A and a version-id value of 2, since this is the latest object version with user key A. Similarly, a GET OBJECT operation on user key B would return the data of the object represented by the fourth element of the key map (B#2), since this is the latest object version with user key B, and a GET OBJECT operation on user key C would return the data of the object represented by the seventh element of the key map (C#2), since this is the latest object version with user key C.

FIG. 12B illustrates the contents of key map 1200 after an additional object version having user key B is stored in the bucket associated with key map 1200. Again, it is assumed, in this example, that versioning is enabled for this bucket at the time the additional object version is stored. Therefore, the newly stored object is an explicit object version with user key B and a newly generated version-id value. As illustrated in this example, a new element is added to the key map between the last element representing objects having the user key A (i.e. the element representing the oldest stored object version with user key A) and the first element representing a previously stored version of the object having user key B (i.e. the element representing the most recently stored version of the object prior to storing this new object version). In this example, the new element, shown in the fourth position in key map 1200, reflects a user key of B, and a simplified version-id value of 1, although the version-id value may in some embodiments comprise a sequencer value and a unique identifier. In the example illustrated in FIG. 12B, a GET OBJECT operation specifying user key B, but not specifying a version-id, may return the data of the explicit object version associated with this new element in key map 1200 (labeled as B#1), because a FIND NEAREST operation specifying user key B may correctly identify this element of key map 1200 as the one representing the latest object version with user key B. Note that the results of a GET OBJECT operation that specifies user key A or user key C would be no different than in the example illustrated in FIG. 12A.

In the examples illustrated in FIGS. 12A and 12B, it is assumed that versioning is enabled for the bucket associated with key map 1200, and that no objects having user keys A, B, or C were stored in the bucket prior to versioning being enabled or while versioning was suspended for the bucket. Therefore, no object versions stored in the bucket having these user keys have a version-id value that is a special sentinel value (i.e. a value reflecting that the object was stored while versioning was off or suspended for the bucket). In the example illustrated in FIG. 12C, key map 1200 includes an element representing one or more objects that were stored in the bucket prior to versioning being enabled or while versioning was suspended. This element, shown as the fourth element in key map 1200, represents an implicit object version having a user key B and a sentinel version-id value. In this example, the implicit object version represented by this element in the key map may have been stored (and/or its data overwritten, as described herein) at any arbitrary time during which versioning was off or enabled. However, in various embodiments, the key map element associated with this implicit object version may appear first in the ordering of elements associated with objects having user key B. For example, in some embodiments, the special sentinel value assigned as the version-id for implicit object versions in the storage system may be a value that is always numerically lower than any other valid version-id in the storage system. In such embodiments, an element representing an implicit version of an object with a given user key may always be the first element in the key map for objects with the given user key. In some embodiments, the version-id portion of key map elements representing implicit object versions may be empty (i.e. it may not contain any value).

In the example illustrated in FIG. 12C, in response to receiving a GET OBJECT operation specifying user key B, but not specifying a version-id, the storage system may invoke a FIND NEAREST operation to determine the latest object version with user key B. However, because the key map includes an element representing an implicit object version with user key B, in this example, it may not be sufficient for the FIND NEAREST operation to merely identify the first element in the key map with user key B. For example, while an element representing an implicit object version for a given key may always appear first in the key map (because the elements were sorted by their version-ids), this implicit object version may not contain the most recently stored data for the given key. Instead, the second element with the given key (i.e. an element representing the most recently stored explicit object version with the given key) may represent the object version that contains the most recently stored data for the given key. Therefore, in some embodiments, the FIND NEAREST operation may need to examine the creation/modification dates of the element associated with the implicit object version and an adjacent element associated with an explicit object version in order to determine which is the latest object version for the given key. In the example illustrated in FIG. 12, a GET OBJECT specifying user key B may compare the creation/modification dates of the implicit object represented by the fourth element of key map 1200, shown as "B(sentinel)" in FIG. 12C, and the explicit object represented by the fifth element of key map 1200 (labeled as B#1), and may return the data of the object with the most recent creation/modification date, as follows:

GetNearest (B)=>Latest (B, B#1)

In some embodiments, security may be added to a bucket by configuring a bucket to enable MFA (Multi-Factor Authentication) Delete. In such embodiments, if MFA is enabled, the bucket owner (or other privileged user) may need to include two forms of authentication in any request to delete an object version or to change the versioning state of the bucket.

In some embodiments, the storage systems described herein may provide the operations described above using standards-based Representational State Transfer (REST) and/or Simple Object Access Protocol (SOAP) interfaces designed to work with a variety of applications, development tools, and/or Internet-development toolkits. These interfaces are similar, but there are some differences. For example, in the REST interface, metadata is returned in HTTP headers. If the storage system only supports HTTP requests of up to a given size (e.g., 4 KB, not including the body), the amount of metadata that may be associated with a stored object may be restricted. Using REST, standard HTTP requests may be issued to create, fetch, and delete buckets and/or objects thereof. In various embodiments, a user may employ a toolkit that supports HTTP in order to use the REST API, or may use a browser to fetch objects, as long as they are anonymously readable. A REST API may use standard HTTP headers and status codes, so that standard browsers and toolkits work as expected. In some embodiments, functionality may be added to HTTP (for example, headers may be added to support access control). In such embodiments, the functionality may be added such that it matches the style of standard HTTP usage. In some embodiments, a SOAP API may provide a SOAP interface (e.g., a SOAP 1.1 interface) using document literal encoding. As with the REST interface, users may employ a SOAP toolkit to create bindings, and then may write code that uses these bindings to communicate with the storage system.

An example of an API that provides access operations in an online or remote storage system that supports object versioning is described in detail below, according to one embodiment. In this example, a PUT or PUT OBJECT operation may specify any or all of the following information for the request, some of which may be input by a user, and some of which may be generated and/or attached to the request by a client or host process: a user key, a bucket identifier, a user/subscriber identifier, an authorization code, a date and/or time stamp reflecting the date/time of the request, the content type, and/or the content size of the data object (e.g., the number of bytes of content stored in the data object). In response, the storage system may return any or all of the following: a status indicator reflecting the success or failure of the operation, an identifier of the request, an internal identifier assigned to the newly stored data object, the version-id assigned by the storage system to the data object, a date and/or time stamp reflecting the date/time at which the data object was stored (e.g., the date/time at which the operation was completed), and/or an identifier of a server on which the data object was stored. In other embodiments, information other that than described above may be included in a PUT or PUT OBJECT request or response.

In this example, a GET OBJECT operation may specify any or all of the following information for the request, some of which may be input by a user, and some of which may be generated and/or attached to the request by a client or host process: a user key, a version-id, a bucket identifier, a user/subscriber identifier, an authorization code, and/or a date or time stamp reflecting the date/time of the request. In response, the storage system may return any or all of the following, in addition to the requested object data: a status indicator reflecting the success or failure of the operation, an internal identifier of the object, an identifier of the request, the version-id of the data object returned in response to the request, a date and/or time stamp reflecting the date/time at which the data object was stored (e.g., the date/time at which the operation was completed), a date and/or time stamp reflecting the last time the returned data object was modified, the content size of the returned data object (e.g., in bytes), the content type of the returned data object, and/or an identifier of a server from which the data object was retrieved. In other embodiments, information other that than described above may be included in a GET OBJECT request or response.

In this example, a COPY OBJECT operation may specify any or all of the following information for the request, some of which may be input by a user, and some of which may be generated and/or attached to the request by a client or host process: a source user key, a version-id, a source bucket identifier, a destination bucket identifier, a destination user key, a user/subscriber identifier, an authorization code, and/or a date or time stamp reflecting the date/time of the request. In response, the storage system may return any or all of the following: a status indicator reflecting the success or failure of the operation, an internal identifier of the source data object, an internal identifier of the copy of the data object, an identifier of the request, the version-id of the source data object (i.e. the version-id of a specified source data object, or of the latest version of a data object, if no version-id was specified), the version-id assigned to the newly created copy of the data object, a date and/or time stamp reflecting the date/time at which the copy of the data object was stored (e.g., the date/time at which the operation was completed), a date and/or time stamp reflecting the last time the data object was modified (which may be the same as the date and/or time stamp reflection the time at which the COPY OBJECT operation was completed), the content size of the copied data object (e.g., in bytes), the content type of the copied data object, an identifier of a server from which the data object was retrieved, and/or an identifier of a server on which the copy of the data object was stored. In other embodiments, information other that than described above may be included in a COPY OBJECT request or response.

In this example, a LIST BUCKET operation may specify any or all of the following information for the request, some of which may be input by a user, and some of which may be generated and/or attached to the request by a client or host process: a bucket identifier, a user/subscriber identifier, an authorization code, a maximum number of user keys for which data should be included in the response, a prefix and/or a delimiter that may be used to filter the results of the operation, and/or a date or time stamp reflecting the date/time of the request. In various embodiments, this API may behave the same irrespective of the current versioning state of the target bucket. In some embodiments, the requester may need to have permission to view and/or retrieve objects in the target bucket in order to perform this operation.

In response to a LIST BUCKET operation, the storage system may return any or all of the following: a status indicator reflecting the success or failure of the operation, an identifier of the request, the bucket identifier, a date and/or time stamp reflecting the date/time at which the list of data object versions was retrieved (e.g., the date/time at which the operation was completed), a maximum number of user keys for which data should be included in the response, an indication of whether the returned list has been truncated (e.g., based on a specified maximum number of user keys), a prefix and/or a delimiter that was used to filter the results of the operation, and a list of the data object versions stored in the bucket that are accessible without specifying a version-id. In this example, each of the elements of the list of data object versions may include any or all of the following: an internal identifier of the object, the version-id of the listed version of the data object, a date and/or time stamp reflecting the last time the listed version of the data object was modified, the content size of the listed version of the data object (e.g., in bytes), the content type of the listed data object, an identifier of the server on which the listed data object is stored, and/or an identifier or display name of the owner of the listed data object. In other embodiments, information other that than described above may be included in a LIST BUCKET request or response.

In this example, a LIST VERSIONS operation may specify any or all of the following information for the request, some of which may be input by a user, and some of which may be generated and/or attached to the request by a client or host process: a bucket identifier, a user/subscriber identifier, an authorization code, a maximum number of user keys for which data should be included in the response, a prefix and/or a delimiter that may be used to filter the results of the operation, a key marker and/or version-id marker (such as those described above) specifying a point at which a search for results should begin, and/or a date or time stamp reflecting the date/time of the request. In other embodiments, this API may behave the same irrespective of the current versioning state of the target bucket. In some embodiments, the requester may need to have permission to view and/or retrieve object versions in the target bucket in order to perform this operation.

In response to a LIST VERSIONS operation, the storage system may return any or all of the following: a status indicator reflecting the success or failure of the operation, an identifier of the request, the bucket identifier, a date and/or time stamp reflecting the date/time at which the list of data object versions was retrieved (e.g., the date/time at which the operation was completed), a maximum number of user keys for which data should be included in the response, an indication of whether the returned list has been truncated (e.g., based on a specified maximum number of user keys), a prefix and/or a delimiter that was used to filter the results of the operation, and a list of the data object versions stored in the bucket that are accessible without specifying a version-id. In this example, each of the elements of the list of data object versions may include any or all of the following: an internal identifier of the object, the version-id of the listed version of the data object, a date and/or time stamp reflecting the last time the listed version of the data object was modified, the content size of the listed version of the data object (e.g., in bytes), the content type of the listed data object, an identifier of the server on which the listed data object is stored, an identifier and/or display name of the owner of the listed data object, an indication of whether the data object version is the latest version of the stored data objects having the same user key, an indication of whether the data object version is a delete marker, and/or an identifier of a storage class. In other embodiments, information other that than described above may be included in a LIST VERSIONS request or response.

In this example, a DELETE KEY operation may specify any or all of the following information for the request, some of which may be input by a user, and some of which may be generated and/or attached to the request by a client or host process: a user key, a bucket identifier, a user/subscriber identifier, an authorization code, a content type, and/or a date or time stamp reflecting the date/time of the request. In response, the storage system may return any or all of the following: a status indicator reflecting the success or failure of the operation (e.g., a "204 No Content" indication may be returned if the delete operation is successful), an identifier of the request, the version-id assigned to the delete marker created in response to the request, an internal identifier of the delete marker, a date and/or time stamp reflecting the date/time at which the delete marker was stored (e.g., the date/time at which the operation was completed), the content size of the delete marker (e.g., zero), and/or an identifier of a server on which the delete marker was stored. In other embodiments, information other that than described above may be included in a DELETE KEY request or response.

In this example, a DELETE VERSION operation may specify any or all of the following information for the request, some of which may be input by a user, and some of which may be generated and/or attached to the request by a client or host process: a user key, a version-id, a bucket identifier, a user/subscriber identifier, an authorization code, a content type, and/or a date or time stamp reflecting the date/time of the request. In response to a DELETE VERSION request, the storage system may return any or all of the following: a status indicator reflecting the success or failure of the operation (e.g., a "204 No Content" indication may be returned if the delete operation is successful), an identifier of the request, the version-id of the deleted object, a date and/or time stamp reflecting the date/time at which the object was deleted (e.g., the date/time at which the operation was completed), the content size of the object following deletion (e.g., zero), an indication of whether the deleted object was a delete marker, and/or an identifier of a server from which the object was deleted. In other embodiments, information other that than described above may be included in a DELETE VERSION request or response.

In this example, a GET VERSIONING operation may specify any or all of the following information for the request, some of which may be input by a user, and some of which may be generated and/or attached to the request by a client or host process: a bucket identifier, a user/subscriber identifier, an authorization code, a content type of the data requested (e.g., the type of a state variable whose value indicates the versioning state, such as "text"), and/or a date or time stamp reflecting the date/time of the request. In response, the storage system may return any or all of the following: the bucket identifier, the value of the versioning state of the bucket, a status indicator reflecting the success or failure of the operation, an identifier of the request, a date and/or time stamp reflecting the date/time at which the operation was completed, the content size of the returned data (e.g., the size of the state information returned, in bytes), the content type of the returned data (e.g., text), and/or an identifier of a server from which the data was retrieved. In other embodiments, information other that than described above may be included in a GET VERSIONING request or response.

In this example, a PUT VERSIONING operation may specify any or all of the following information for the request, some of which may be input by a user, and some of which may be generated and/or attached to the request by a client or host process: a bucket identifier, a user/subscriber identifier, an authorization code, the content size of the data to be stored in a state variable whose value reflects the versioning state (e.g., the size of the state information to be stored, in bytes), the content type of the data to be stored (e.g., text), the value to be stored (e.g., in a state variable) to indicate the new versioning state, and/or a date or time stamp reflecting the date/time of the request. In response, the storage system may return any or all of the following: the bucket identifier, the value of the new versioning state of the bucket, a status indicator reflecting the success or failure of the operation, an identifier of the request, a date and/or time stamp reflecting the date/time at which the operation was completed, the content size of the returned stored (e.g., the size of the state information stored, in bytes), the content type of the returned data (e.g., text), and/or an identifier of a server one which the data was stored. In other embodiments, information other that than described above may be included in a PUT VERSIONING request or response.

In this example, a PUT ACL operation may specify any or all of the following information for the request, some of which may be input by a user, and some of which may be generated and/or attached to the request by a client or host process: a bucket identifier, a user key, a version-id, a user/subscriber identifier, an authorization code, the content size of the access control list to be PUT to the object specified by the user key and/or version-id, the access control list to be PUT to the object, an identifier or display name of the owner of the targeted bucket, object, or access control policy, and/or a date or time stamp reflecting the date/time of the request. In response, the storage system may return any or all of the following: a status indicator reflecting the success or failure of the operation, an internal identifier of the object, an identifier of the request, the version-id of the object to which the ACL was PUT, a date and/or time stamp reflecting the date/time at which the ACL was stored (e.g., the date/time at which the operation was completed), a date and/or time stamp reflecting the last time the ACL for the object was modified, and/or an identifier of a server from which the data object was retrieved. In other embodiments, information other that than described above may be included in a PUT ACL request or response. In some embodiments, the API may define an operation to associate metadata with an object or store metadata in an object other than an ACL (e.g., the API may define a store type operation for another type of metadata), and such an operation may behave in a manner similar to that described above for a PUT ACL operation.

In this example, a GET ACL operation may specify any or all of the following information for the request, some of which may be input by a user, and some of which may be generated and/or attached to the request by a client or host process: a user key, a version-id, a bucket identifier, a user/subscriber identifier, an authorization code, and/or a date or time stamp reflecting the date/time of the request. In response, the storage system may return any or all of the following: a status indicator reflecting the success or failure of the operation, an internal identifier of the object for which the ACL was retrieved, an identifier of the request, the version-id of the object for which the ACL was retrieved, a date and/or time stamp reflecting the date/time at which the ACL was retrieved (e.g., the date/time at which the operation was completed), a date and/or time stamp reflecting the last time the returned ACL was modified, the content size of the returned data (e.g., the size of the ACL, in bytes), the content type of the returned data, the ACL data itself, an identifier or display name of the owner of the targeted bucket, object, or access control policy, and/or an identifier of a server from which the data object was retrieved. In other embodiments, information other that than described above may be included in a GET ACL request or response. In some embodiments, the API may define an operation to retrieve metadata associated with an object or stored in an object other than an ACL (e.g., the API may define a retrieve type operation for another type of metadata), and such an operation may behave in a manner similar to that described above for a GET ACL operation.

Note that in some embodiments of the APIs described herein, various pairs of operations may be initiated by a user/requester using the same API, but the requester may specify a different number of input parameter values for the two operations (e.g., the requester may specify an additional version-id value for one operation in the pair). In such embodiments, PUT, GET, COPY, and DELETE type operations may be invoked by a requester without the requester being aware of (or needing to know) the versioning state of the target bucket in the storage system. In such embodiments, a privileged user may initiate version-specific operations (e.g. for GET, COPY, and/or DELETE type operations) using these same APIs by specifying an additional input (i.e. a version-id value) in the operation call. In other embodiments, different APIs may be defined for two similar operations, one of which expects a version-id value to be specified, and one of which does not include (or expect) a version-id value to be specified. For example, the GET OBJECT API described herein may be invoked with or without specifying a version-id. In other embodiments, two different APIs may be defined for a GET OBJECT type operation (e.g., a GET KEY operation that does not take a version-id input, and a GET OBJECT VERSION operation that takes an additional version-id input). Similarly, the COPY OBJECT API described herein may be invoked with or without specifying a version-id. However, in other embodiments, two COPY OBJECT type APIs may be defined (only one of which takes a version-id input). Conversely, two different DELETE OBJECT type APIs (DELETE KEY and DELETE VERSION) are defined herein. In other embodiments, a single DELETE OBJECT API may be defined that can be invoked with or without specifying a version-id value.

In some embodiments, the system and methods described herein for versioning of stored objects may be employed by a storage service that provides storage for subscribers as part of a virtualized computing service. In various embodiments, virtualized computing may be offered as an on-demand, paid service to clients, and may include a virtualized storage service, which may in some embodiments support object versioning, as described herein. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources.

Example Computer System Embodiment

It is contemplated that in some embodiments, any of the methods, techniques or components described herein may be implemented as instructions and data capable of being stored or conveyed via a computer-accessible medium. Such methods or techniques may include, for example and without limitation, various methods of configuring and initializing a storage system that supports versioning, and performing various operations to store, retrieve, modify and otherwise access data objects and/or access control lists thereof on that storage system according to the APIs described herein. Such instructions may be executed to perform specific computational functions tailored to specific purposes (e.g., processing web services traffic; performing high-precision numerical arithmetic; storing, retrieving, modifying and/or otherwise accessing data objects and/or access control lists thereof; maintaining multiple versions of stored data objects, etc.) as well as higher-order functions such as operating system functionality, virtualization functionality, network communications functionality, application functionality, storage system functionality, and/or any other suitable functions.

Figure 13:
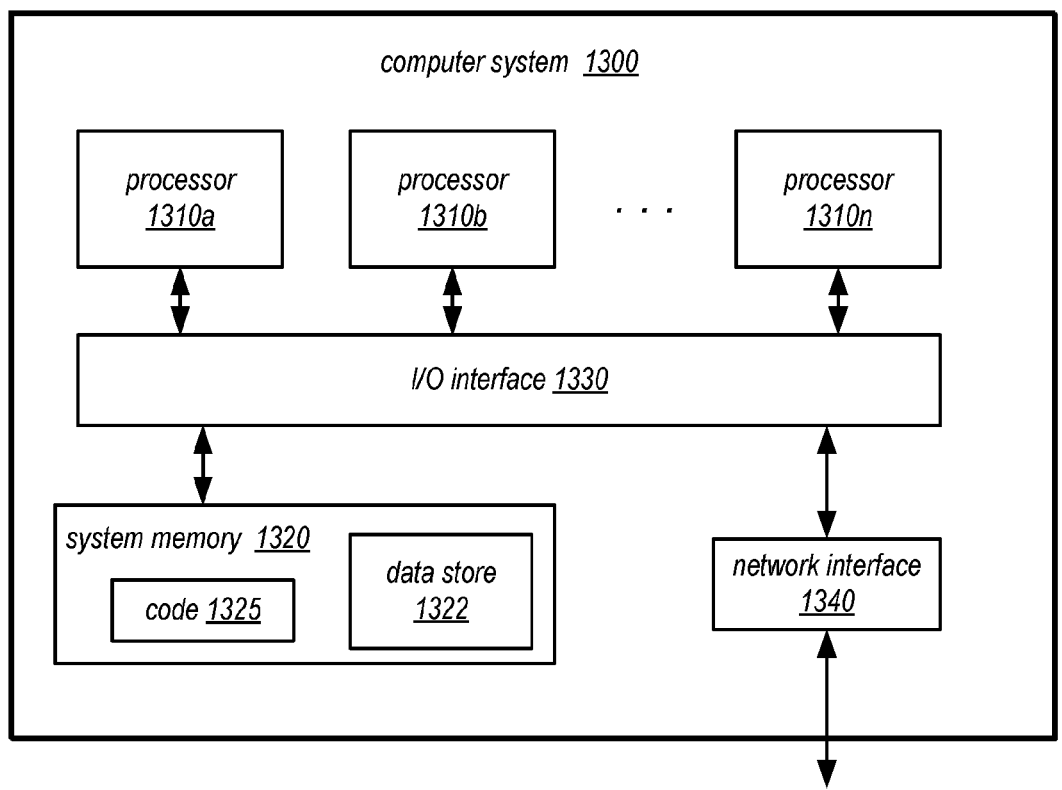
FIG. 13 illustrates one embodiment of a computer system that supports versioning of stored data objects, as described herein.

One example embodiment of a computer system that includes computer-accessible media and that supports versioning of stored objects is illustrated in FIG. 13. In various embodiments, the functionality of any of the various modules or methods described herein may be implemented by one or several instances of computer system 1300. In particular, it is noted that different elements of the system described herein may be implemented by different computer systems 1300. For example, a storage system that supports the versioning functionality described herein may be implemented on the same computer system 1300 on which a client (through which a user/requester accesses the storage system) executes, or on another computer system 1300, in different embodiments.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1310 may commonly, but not necessarily, implement the same ISA.

System memory 1320 may be configured to store instructions (e.g., code 1325) and data (e.g., in data store 1322) accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting versioning of stored data objects, and for performing various operations to store, retrieve, modify and otherwise access data objects and/or access control lists thereof on a storage system according to the APIs described herein), are shown stored within system memory 1320 as code 1325. It is noted that in some embodiments, code 1325 may include instructions and data implementing desired functions that are not directly executable by processor 1310 but are represented or encoded in an abstract form that is translatable to instructions that are directly executable by processor 1310. For example, code 1325 may include instructions specified in an ISA that may be emulated by processor 1310, or by other code 1325 executable on processor 1310. Alternatively, code 1325 may include instructions, procedures or statements implemented in an abstract programming language that may be compiled or interpreted in the course of execution. As non-limiting examples, code 1325 may include code specified in a procedural or object-oriented programming language such as C or C++, a scripting language such as perl, a markup language such as HTML or XML, or any other suitable language. In some embodiments, objects (e.g., data objects and/or delete marker objects in one or more buckets) and/or access control lists thereof may be stored in a data store 1322 within system memory 1320.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to network 130, such as other computer systems, for example. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1320 may include a non-transitory, computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 1300 via I/O interface 1330. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 1300 as system memory 1320 or another type of memory. A computer-accessible storage medium may generally be accessible via transmission media or signals such as electrical, electromagnetic, or digital signals, conveyed via a communication medium such as a network and/or a wireless link, such as may be implemented via network interface 1340.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a data store that stores a plurality of objects, wherein at least some of the plurality of objects comprise a same user key and different version identifiers;
one or more processors;
a memory coupled to the one or more processors and storing program instructions that when executed by the one or more processors cause the one or more processors to perform:
receiving a request directed to an object from the data store, wherein the request specifies a user key for the object; and
in response to receiving the request directed to the object:
determining whether the request specifies a particular object version for the object having the specified user key;
in response to determining the request specifies a particular object version identifier for the object, performing the request for the object having the specified user key and the specified particular object version identifier; and
in response to determining the request does not specify a particular object version for the object, performing the request for an object version of the object with the specified user key having a latest object version identifier.

2. The system of claim 1, wherein when executed by the one or more processors, the program instructions further cause the one or more processors to perform:
determining whether the latest object version of the object with the specified user key is a delete marker object; and
in response to determining the latest object version of the object with the specified user key is a delete marker object, refraining from returning object data contained in any of the plurality of objects stored in the data store.

3. The system of claim 2, wherein the delete marker object does not contain object data.

4. The system of claim 1, wherein when executed by the one or more processors, the program instructions further cause the one or more processors to perform, prior to receiving the request directed to the object:
receiving a request to perform a delete operation, wherein the request to perform a delete operation includes the specified user key for the object but does not specify a version identifier; and
in response to receiving the request to perform a delete operation:
generating a new, unique version identifier;
creating a delete marker object, wherein the delete marker object comprises the specified user key for the object and the new, unique version identifier, and wherein the delete marker object becomes the latest object version that is stored in the memory that comprises the specified user key for the object;
refraining from deleting any of the plurality of objects previously stored in the memory in response to receiving the request to perform a delete operation; and
storing the delete marker object in the data store.

5. The system of claim 1, wherein when executed by the one or more processors, the program instructions further cause the one or more processors to perform:
receiving a request to perform a delete operation, wherein the request to perform a delete operation includes the specified user key for the object and a version identifier of a particular version of the object; and
in response to receiving the request to perform a delete operation, deleting the particular version of the object from the data store.

6. The system of claim 1, wherein when executed by the one or more processors, the program instructions further cause the one or more processors to perform:
receiving a request to perform an operation to list user keys of the objects stored in the data store; and
in response to receiving the request to perform an operation to list user keys:
returning a list of user keys contained in object versions stored in the data store, wherein the list does not include user keys contained in delete marker objects that are the latest object versions containing those user keys.

7. The system of claim 1, wherein when executed by the one or more processors, the program instructions further cause the one or more processors to perform:
receiving a request to perform an operation to list all object versions stored in the data store; and
in response to receiving the request to perform an operation to list all object versions:
returning a list of all object versions stored in the data store, wherein the list includes any delete marker objects stored in the data store.

8. A non-transitory, computer-readable storage medium storing program instructions that when executed on one or more computers cause the one or more computers to perform:
receiving a request directed to an object from the data store, wherein the data store stores multiple versions of objects for at least some objects stored in the data store, wherein the request specifies a user key but does not specify a version identifier;
determining an object version of the object having the specified user key with a latest object version identifier; and
performing the request for the object version of the object with the specified user key having the latest object version identifier.

9. The non-transitory, computer-readable storage medium of claim 8, wherein when executed on the one or more computers, the program instructions further cause the one or more computers to perform:
receiving a request for an object from the data store, wherein the request specifies a user key and a version identifier; and
performing the request for a particular version of the object having the specified user key and the specified version identifier.

10. The non-transitory, computer-readable storage medium of claim 8, wherein when executed on the one or more computers, the program instructions further cause the one or more computers to perform:
receiving a request to perform a delete operation, wherein the request to perform a delete operation specifies a user key but does not specify a version identifier; and
in response to receiving the request to perform a delete operation:

generating a new, unique version identifier;
creating a delete marker object, wherein the delete marker object comprises the specified user key and the new, unique version identifier, and wherein the delete marker object becomes the latest object version that is stored in the data store that comprises the specified user key; and
refraining from deleting any of the plurality of objects previously stored in the data store in response to receiving the request to perform a delete operation; and
storing the delete marker object in the data store.

11. The non-transitory, computer-readable storage medium of claim 10, wherein the delete marker object stored in the data store does not contain object data.

12. The non-transitory storage medium of claim 8, wherein when executed on the one or more computers, the program instructions further cause the one or more computers to perform:
receiving a request to perform a delete operation, wherein the request specifies a user key and a version identifier, and wherein the specified user key and version identifier pair identifies a delete marker object; and
in response to receiving the request to perform a delete operation, deleting the delete marker object from the data store.

13. The non-transitory, computer-readable storage medium of claim 8, wherein when executed on the one or more computers, the program instructions further cause the one or more computers to perform:
suspending an object versioning feature for the data store;
receiving a request to perform a delete operation, wherein the request specifies a user key, but does not specify a version identifier; and
in response to receiving the request to perform a delete operation:
creating a new delete marker object comprising a special, sentinel version identifier and the specified user key; and
storing the new delete marker object in the data store;
wherein creating the new delete marker comprises:
deleting object data contained in an object previously stored in the data store and comprising the specified user key and the special sentinel version identifier; and
marking the object previously stored in the data store and comprising the specified user key and the special sentinel version identifier as a delete marker object.

14. A method, comprising:
receiving a request directed to an object from a data store, wherein the data store stores multiple versions of objects for at least some objects stored in the data store, wherein the request specifies a user key for the object, but does not specify a version identifier;
determining an object version of the object having the specified user key with a latest object version identifier; and
performing the request for an object version of the object with the specified user key having the latest object version identifier.

15. The method of claim 14, further comprising:
receiving a request directed to an object from the data store, wherein the request specifies a user key for the object and a particular version identifier, wherein the version identifier is not a version identifier for the latest version of the object; and
performing the request for an object version of the object with the specified user key having the specified object version identifier.

16. The method of claim 14, further comprising:
receiving a request directed to an object from the data store, wherein the request specifies a user key for the object, but does not specify a version identifier;
determining an object version of the object having the specified user key with a latest object version identifier, wherein the latest object version identifier is a delete marker object; and
refraining from returning object data contained in any of the plurality of objects stored in the data store.

17. The method of claim 14, further comprising:
receiving a request directed to an object from the data store, wherein the request specifies a user key for the object and a particular version identifier, wherein the version identifier is not a version identifier for the latest version of the object, and wherein the version identifier is a delete marker object; and
returning an error indication.

18. The method of claim 14, further comprising:
receiving a request to delete an object from the data store, wherein the request specifies a user key for the object and a particular version identifier, wherein the version identifier is not a version identifier for the latest version of the object, and wherein the version identifier is a delete marker object; and
deleting the delete marker object from the data store.

19. The method of claim 14, further comprising:
suspending an object versioning feature for the data store;
receiving a request to perform a delete operation, wherein the request specifies a user key, but does not specify a version identifier; and
in response to receiving the request to perform a delete operation:
creating a new delete marker object comprising a special, sentinel version identifier and the specified user key; and
storing the new delete marker object in the data store;
wherein creating the new delete marker comprises:
deleting object data contained in an object previously stored in the data store and comprising the specified user key and the special sentinel version identifier; and
marking the object previously stored in the data store and comprising the specified user key and the special sentinel version identifier as a delete marker object.

20. The method of claim 14, further comprising:
receiving a request to perform a delete operation, wherein the request to perform a delete operation specifies a user key but does not specify a version identifier; and
in response to receiving the request to perform a delete operation:
generating a new, unique version identifier;
creating a delete marker object, wherein the delete marker object comprises the specified user key and the new, unique version identifier, and wherein the delete marker object becomes the latest object version that is stored in the data store that comprises the specified user key; and
refraining from deleting any of the plurality of objects previously stored in the data store in response to receiving the request to perform a delete operation; and
storing the delete marker object in the data store.

21. The method of claim 20, wherein the delete marker object stored in the data store does not contain object data.

\* \* \* \* \*